(12) United States Patent  
Machida et al.

(10) Patent No.: US 11,966,054 B2
(45) Date of Patent: Apr. 23, 2024

(54) DISPLAY DEVICE

(71) Applicant: SONY CORPORATION, Tokyo (JP)

(72) Inventors: Akio Machida, Tokyo (JP); Misaki Shimizu, Tokyo (JP); Mitsuru Akahori, Tokyo (JP); Nobuhiro Suzuki, Tokyo (JP)

(73) Assignee: SONY CORPORATION, Tokyo (JP)

(*) Notice: Subject to any disclaimer, the term of this patent is extended or adjusted under 35 U.S.C. 154(b) by 464 days.

(21) Appl. No.: 17/055,176

(22) PCT Filed: Apr. 26, 2019

(86) PCT No.: PCT/JP2019/017911
§ 371 (c)(1),
(2) Date: Nov. 13, 2020

(87) PCT Pub. No.: WO2019/220931
PCT Pub. Date: Nov. 21, 2019

(65) Prior Publication Data
US 2021/0149202 A1    May 20, 2021

(30) Foreign Application Priority Data

May 15, 2018 (JP) ................. 2018-093662

(51) Int. Cl.
G02B 27/01    (2006.01)

(52) U.S. Cl.
CPC ..... *G02B 27/0172* (2013.01); *G02B 27/0176* (2013.01); *G02B 2027/0118* (2013.01);
(Continued)

(58) Field of Classification Search
CPC ............ G02B 27/0172; G02B 27/0176; G02B 2027/0118; G02B 2027/0158; G02B 2027/0178
See application file for complete search history.

(56) References Cited

U.S. PATENT DOCUMENTS 9,558,540 B2 *   1/2017  Mukawa .............. G06F 18/22
2012/0206816 A1 * 8/2012  Yoshida .............. G02B 27/145
                                              359/630
(Continued)

FOREIGN PATENT DOCUMENTS

CN   103995353 A   8/2014
CN   104067159 A   9/2014
(Continued)

OTHER PUBLICATIONS

International Search Report and Written Opinion of PCT Application No. PCT/JP2019/017911, dated Jun. 18, 2019, 08 pages of ISRWO.

Primary Examiner — George G. King
Assistant Examiner — Anna Smith
(74) Attorney, Agent, or Firm — CHIP LAW GROUP

(57) ABSTRACT

A display device includes a frame that includes a front portion, temple portions, and a pad portion, and is mounted on head of an observer, and an image display device attached to the frame. The image display device includes an image forming device, and an optical device on which light emitted from the image forming device is incident and from which the light is emitted toward the observer. One end portion of the optical device is fixed to a temple portion side of the front portion. Other end portion of the optical device is on a pad portion side of the front portion. A light shielding member that prevents external light from being incident on the other end portion of the optical device from above the other end portion of the optical device is attached to the pad portion side of the front portion.

14 Claims, 18 Drawing Sheets

(52) U.S. Cl.
    CPC ............... *G02B 2027/0158* (2013.01); *G02B 2027/0178* (2013.01)

(56) References Cited

U.S. PATENT DOCUMENTS

| | | |
|---|---|---|
| 2013/0300766 A1 | 11/2013 | Mukawa |
| 2014/0340286 A1 | 11/2014 | Machida et al. |
| 2015/0277125 A1* | 10/2015 | Hirano ............... G02B 27/0176 359/633 |
| 2019/0227309 A1* | 7/2019 | Kadono .................. G09G 3/36 |
| 2020/0264486 A1* | 8/2020 | Kadono ............... G02F 1/1524 |

FOREIGN PATENT DOCUMENTS

| | | | |
|---|---|---|---|
| CN | 203930212 U | 11/2014 | |
| CN | 104423044 A | 3/2015 | |
| CN | 106105183 A | 11/2016 | |
| CN | 111201487 A * | 5/2020 | ......... G02B 27/0172 |
| EP | 2808725 A1 | 12/2014 | |
| EP | 3211602 A1 * | 8/2017 | ......... G02B 27/0172 |
| JP | H01167735 A | 7/1989 | |
| JP | H09281433 A | 10/1997 | |
| JP | 2005-521099 A | 7/2005 | |
| JP | 2014-111710 A | 6/2014 | |
| JP | 2014-132328 A | 7/2014 | |
| JP | 2014-159385 A | 9/2014 | |
| JP | 2014-174367 A | 9/2014 | |
| JP | 2014-219468 A | 11/2014 | |
| JP | 2016-148855 A | 8/2016 | |
| WO | WO-2015137165 A1 * | 9/2015 | ......... G02B 27/0176 |
| WO | WO-2016174843 A1 | 11/2016 | |

* cited by examiner

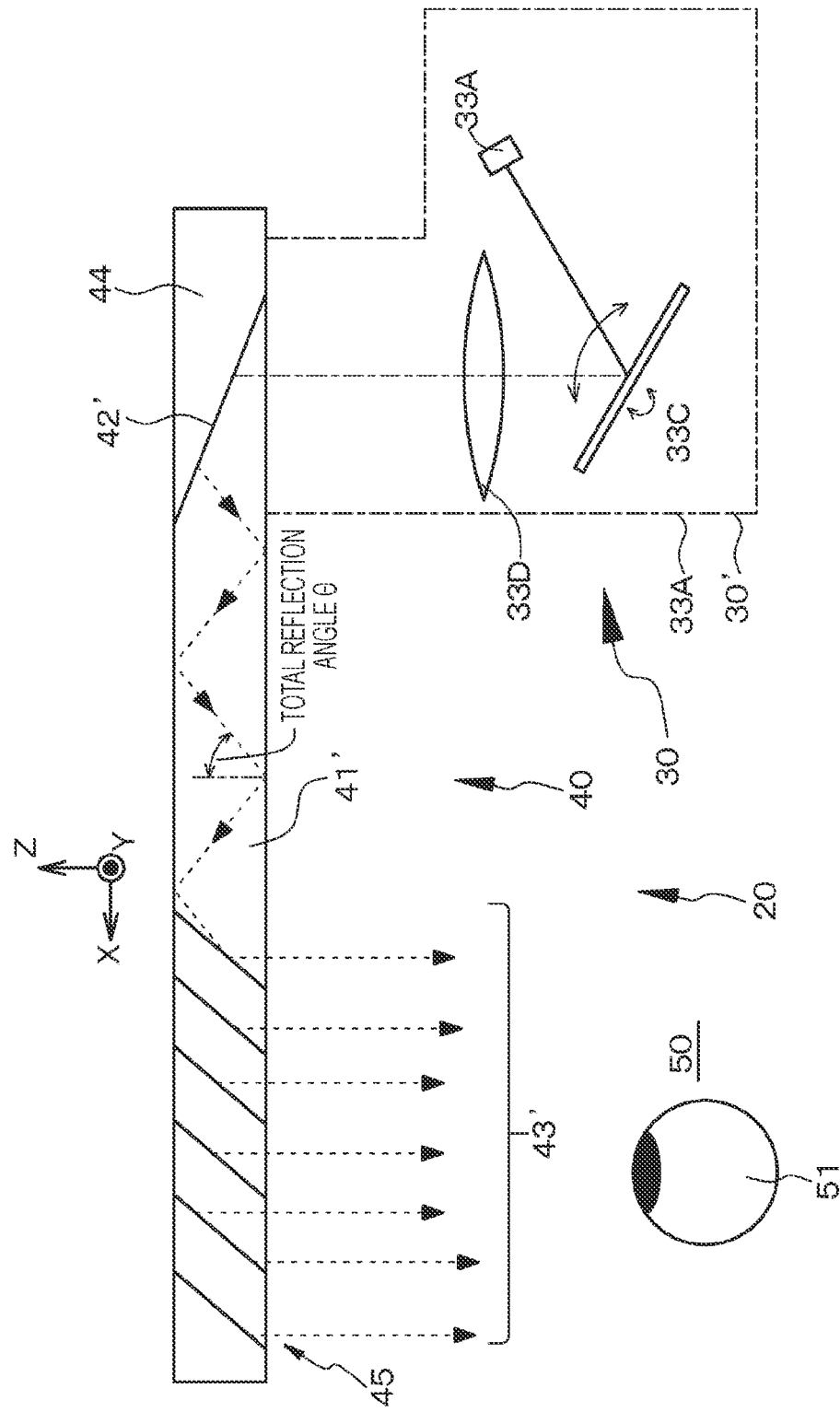

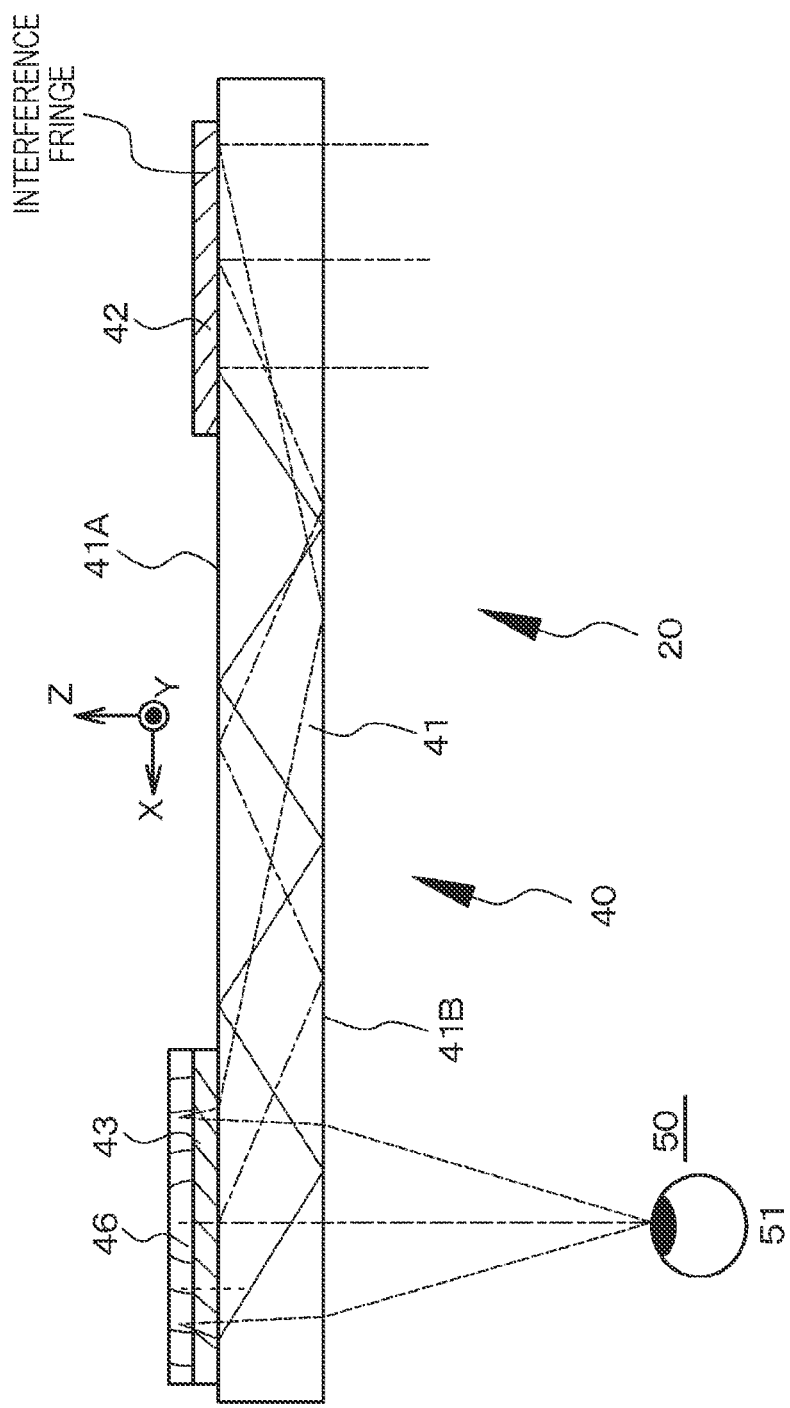

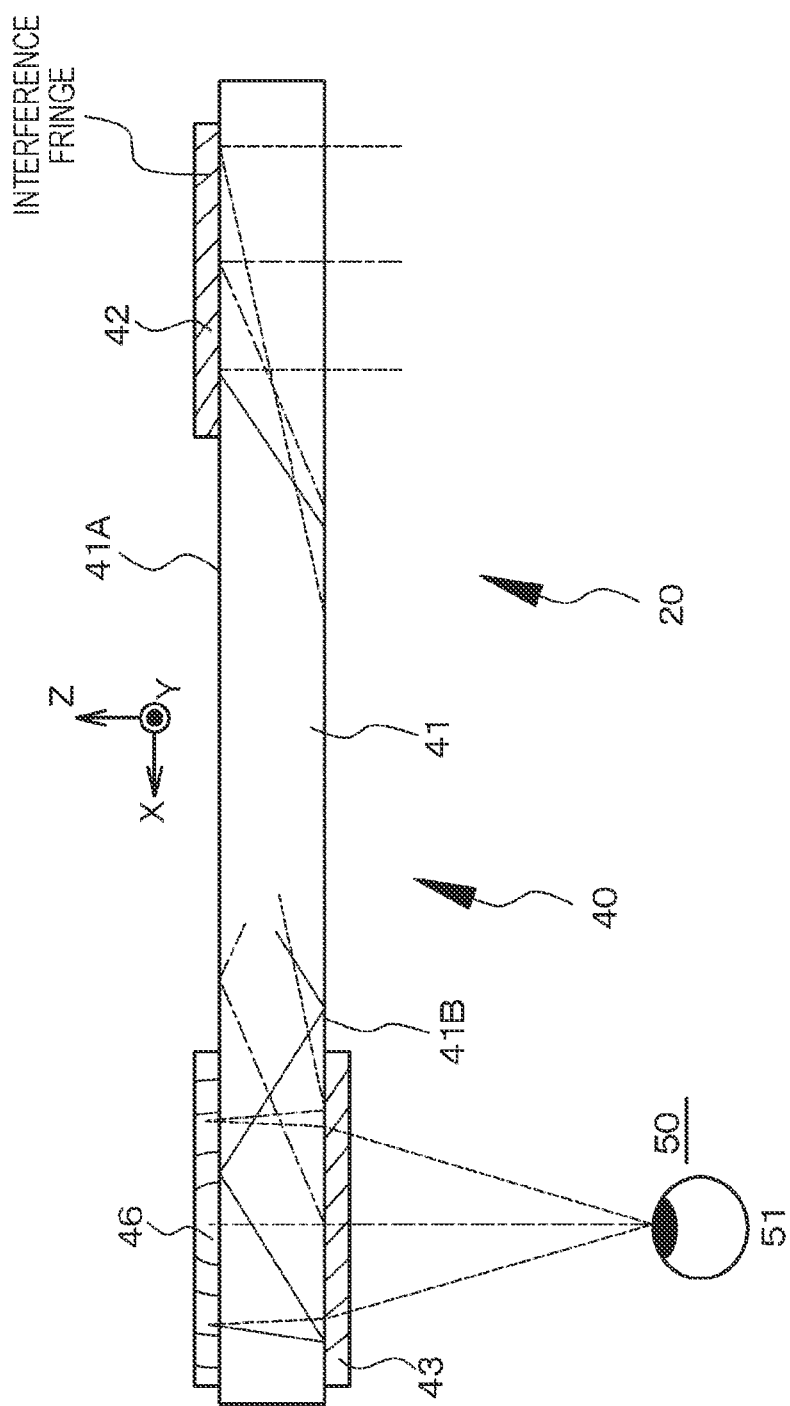

DISPLAY DEVICE

CROSS REFERENCE TO RELATED APPLICATIONS

This application is a U.S. National Phase of International Patent Application No. PCT/JP2019/017911 filed on Apr. 26, 2019, which claims priority benefit of Japanese Patent Application No. JP 2018-093662 filed in the Japan Patent Office on May 15, 2018. Each of the above-referenced applications is hereby incorporated herein by reference in its entirety.

TECHNICAL FIELD

The present disclosure relates to a display device, and more specifically to a display device used for a head mounted display (HMD).

BACKGROUND ART

In recent years, augmented reality (AR) technology that synthesizes and presents a virtual object and various kinds of information in a form of electronic information to a real environment (or a part thereof) as additional information has attracted attention. In order to achieve the augmented reality technology, for example, a head mounted display has been studied as a device for presenting visual information. In addition, as an application field, work support in a real environment has been expected, and examples thereof include provision of road guidance information and provision of technical information to an engineer who performs maintenance or the like, for example. Particularly, a head mounted display is very convenient because of not occupying hands. Furthermore, even in a case where a person obtains various kinds of information and the like while moving outdoors, the person can capture various kinds of information and the like constituted by videos or images and an external environment at the same time in the field of view. Therefore, the person can move smoothly.

A virtual image display device (display device) for causing an observer to observe a two-dimensional image formed by an image forming device as an enlarged virtual image by a virtual image optical system is well known, for example, from Japanese Patent Application Laid-Open No. 2014-219468.

In the virtual image display device disclosed in Japanese Patent Application Laid-Open No. 2014-219468, in a peripheral portion of a light guide device (optical member) 20, on an upper side closer to a frame 107, a rib 10n to be fitted in a limiting portion 107n disposed on a lower surface of the frame 107 is formed. The presence of the rib 10n limits a displacement of the light guide device 20 in a depth direction (Z direction) (see paragraph [0046] of Japanese Patent Application Laid-Open No. 2014-219468). In addition, the light guide device 20 is directly fixed to a second fixing portion 61e disposed at a lateral end portion 65a of the frame 107 by using a protruding attachment portion 10g formed on a neck portion of the frame 107. By screwing a screw 61v into a screw hole 10u through a screw hole 61u, the light guide device 20 is detachably fixed to the frame 107 (see paragraph [0047] of Japanese Patent Application Laid-Open No. 2014-219468). Furthermore, the frame 107 and a protector 108 are separated from or loosely in contact with an oval peripheral portion of the light guide device 20 excluding a root side connected to first and second image forming main body portions 105a and 105b. Even if there is a difference in coefficient of thermal expansion between the light guide device 20 and a frame portion 102 including the frame 107 and the protector 108, expansion of the light guide device 20 within the frame portion 102 is allowed, and it is possible to prevent distortion, deformation, and breakage in the light guide device (see paragraph [0028] of Japanese Patent Application Laid-Open No. 2014-219468).

As described above, in the virtual image display device disclosed in Japanese Patent Application Laid-Open No. 2014-219468, in a peripheral portion of the light guide device (optical member) 20, on an upper side closer to the frame 107, the rib 10n to be fitted in the limiting portion 107n disposed on a lower surface of the frame 107 is formed. An ear side portion of the light guide device 20 is fixed to the frame 107 with the screw 61v. Furthermore, the frame 107 and the protector 108 are separated from or loosely in contact with a nose side portion of the light guide device 20. Even if there is a difference in coefficient of thermal expansion between the light guide device 20 and the frame portion 102 including the frame 107 and the protector 108, expansion of the light guide device 20 within the frame portion 102 is allowed.

CITATION LIST

Patent Document

Patent Document 1: Japanese Patent Application Laid-Open No. 2014-219468

SUMMARY OF THE INVENTION

Problems to be Solved by the Invention

By the way, in the above-described conventional display device (virtual image display device), when the display device is mounted on the head of an observer depending on the observer, a temple portion 104 may spread outward. As a result, in such a case, a stress is applied to a front portion 107a of the frame 107, and a region of the front portion 107a of the frame 107 between the temple portion 104 and a nose receiving portion 40 is distorted. When such a region of the front portion 107a of the frame 107 is distorted, the light guide device (optical member) 20 has its peripheral portion fitted into the limiting portion 107n disposed on a lower surface of the frame 107. Therefore, the light guide device 20 is also distorted. Furthermore, the nose side portion of the light guide device 20, separated from or loosely in contact with the frame 107 and the protector 108, comes into strong contact with the frame 107 and the protector 108, and the light guide device 20 is further distorted. Then, when the light guide device 20 is distorted, an image observed by an observer is also distorted. Furthermore, a nose side end portion of the light guide device 20 is only in contact with the protector 108. Therefore, in a case where the sun is located above the head of an observer, and the sunlight is directly incident on an end face of the nose side portion of the light guide device 20, stray light is generated inside the light guide device 20 to deteriorate the quality of an image disadvantageously.

Therefore, a first object of the present disclosure is to provide a display device having a configuration and a structure that are unlikely to deteriorate the quality of an image even in a case where an optical device (light guide device) is directly irradiated with the sunlight. Furthermore, a second object of the present disclosure is to provide a display device having a configuration and a structure having little influence on the quality of an image observed by an observer even in a case where a temple portion spreads outward when the display device is mounted on the head of the observer depending on the observer.

Solutions to Problems

A display device according to first and second aspects of the present disclosure for achieving the first and second objects described above is a display device including:
a frame that includes a front portion disposed in front of an observer, temple portions extending from both ends of the front portion, and a pad portion, and is to be mounted on the head of the observer; and
an image display device attached to the frame, in which the image display device includes:
an image forming device; and
an optical device on which light emitted from the image forming device is incident and from which the light is emitted toward the observer, and
one end portion of the optical device is fixed to a temple portion side of the front portion.

In addition, in the display device according to the first aspect of the present disclosure, the other end portion of the optical device is disposed on a pad portion side of the front portion, and a light shielding member that prevents external light from being incident on the other end portion of the optical device from above the other end portion of the optical device is attached to the pad portion side of the front portion.

Furthermore, in the display device according to the second aspect of the present disclosure, the other end portion of the optical device is disposed on a pad portion side of the front portion and freely slides on the front portion.

BRIEF DESCRIPTION OF DRAWINGS

FIG. 12 is a view schematically illustrating arrangement of an image forming device and an optical device constituting a modification of the display device of Example 5.

FIG. 15 is a view schematically illustrating a modification of the optical device constituting the display device of Example 3 or 4.

FIG. 16 is a view schematically illustrating another modification of the optical device constituting the display device of Example 3 or 4.

MODE FOR CARRYING OUT THE INVENTION

Figure 1A:
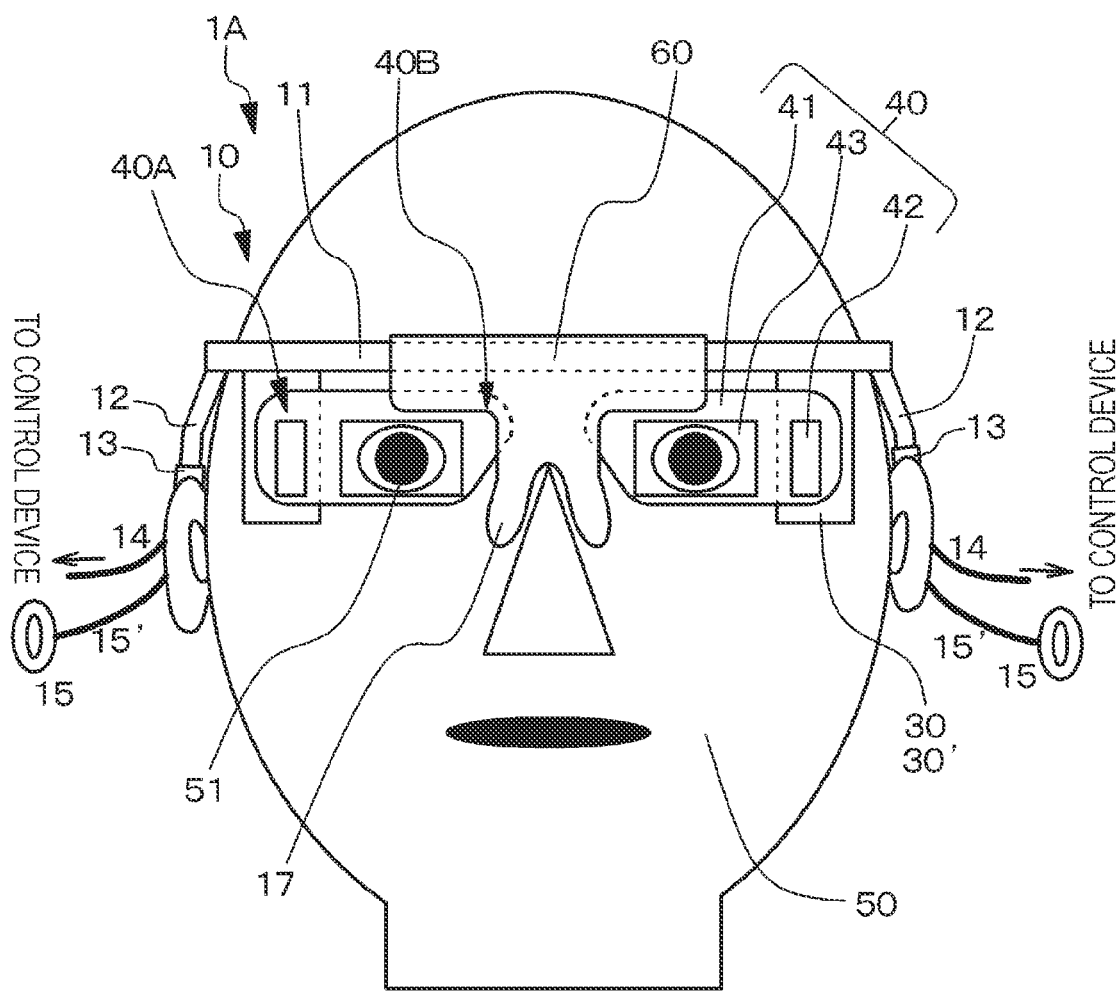
FIG. 1A is a schematic view of a display device of Example 1 as viewed from the front.

Hereinafter, the present disclosure will be described on the basis of Examples with reference to the drawings. However, the present disclosure is not limited to Examples, and various numerical values and materials in Examples are illustrative. Note that description will be made in the following order.
1. General description of display devices according to first and second aspects of the present disclosure
2. Example 1 (display device according to the first aspect of the present disclosure)
3. Example 2 (display device according to the second aspect of the present disclosure)
4. Example 3 (image display device and optical device constituting display device of Examples 1 and 2)
5. Example 4 (modification of Example 3)
6. Example 5 (modification of Examples 3 and 4)
7. Example 6 (another modification of Examples 1 to 4 and dimmer)
8. Others <General Description of Display Devices According to First and Second Aspects of the Present Disclosure>

In a display device according to a first aspect of the present disclosure, the other end portion of an optical device may freely slide on a facing surface of a light shielding member facing an observer. Alternatively, the other end portion of the optical device may be in no contact with the facing surface of the light shielding member facing the observer.

In a display device according to a second aspect of the present disclosure, an optical device receiving member may be attached to a pad portion side of a front portion, and the other end portion of the optical device may freely slide on the optical device receiving member. In addition, in this case, the optical device receiving member may be constituted by a member having an L-shaped cross section when being cut with a virtual horizontal plane, a first portion of the optical device receiving member, corresponding to an L-shaped vertical bar, may extend in a vertical direction facing an observer, a second portion of the optical device receiving member, corresponding to an L-shaped horizontal bar extending from an end portion of the first portion of the optical device receiving member farther from the observer, may extend to a temple portion side of the front portion, and the other end portion of the optical device may freely slide on a facing surface of the second portion of the optical device receiving member facing the observer. Alternatively, the optical device receiving member may be constituted by a rod-shaped or planar member extending in a vertical direction facing the observer, and the other end portion of the optical device may freely slide on a facing surface of the optical device receiving member constituted by the rod-shaped or planar member facing the observer. Note that the state of "extending in a vertical direction" includes not only a state of extending in a strictly vertical direction but also a state of extending in a direction slightly deviating from the vertical direction.

In the display device according to the first and second aspects of the present disclosure including the preferable forms described above, one end portion of the optical device may be attached to the image forming device disposed on a temple portion side of the front portion, although not being limited thereto. Specifically, for example, it is only required to attach one end portion of the optical device to the image forming device using an adhesive or a screw.

Moreover, in the display device according to the first and second aspects of the present disclosure including the preferable forms described above, the optical device may include:

a light guide plate in which light incident from the image forming device is propagated by total reflection inside the light guide plate, and then the light is emitted toward an observer;

a first deflecting unit that deflects the light incident on the light guide plate such that the light incident on the light guide plate is totally reflected inside the light guide plate; and a second deflecting unit that deflects the light propagated by total reflection inside the light guide plate for emitting the light propagated by total reflection inside the light guide plate from the light guide plate. Note that the term "total reflection" means total internal reflection or total reflection inside the light guide plate. The light incident from the image forming device is propagated by total reflection inside the light guide plate and then emitted toward the observer, and the second deflecting unit constitutes a virtual image forming region of the optical device.

Moreover, in the display device according to the first and second aspects of the present disclosure including the preferable forms described above, the image forming device may be attached to a temple portion side of the front portion. Specifically, it is only required to attach a casing including the image forming device therein to the front portion on a temple portion side, to each of the temple portions, or from the front portion on the temple portion side to each of the temple portions. Attachment of the image forming device (attachment of the casing) may be performed by an appropriate method such as a method using a screw, for example.

Moreover, in the display device according to the first and second aspects of the present disclosure including the preferable forms described above, the optical device may further include a dimmer that adjusts the amount of external light incident from the outside. The dimmer will be described in detail in Example 6.

The light shielding member only needs to be manufactured from various opaque plastic materials, metal materials, and alloy materials, and only needs to be attached to a pad portion side of the front portion by an appropriate method such as a method using an adhesive or a method using a screw. Specifically, the light shielding member may be attached to a pad portion side of the front portion, may be attached to the pad portion, may be integrated with the front portion, or may be integrated with the pad portion. The structure in which the light shielding member is integrated with the front portion and the structure in which the light shielding member is integrated with the pad portion are also included in the structure in which "the light shielding member is attached to a pad portion side of the front portion". The length of the light shielding member located above the light guide plate is preferably 10% to 100% of the length of the axis of the light guide plate (longitudinal direction or horizontal direction, corresponding to an X-axis direction), but is not limited thereto.

The optical device receiving member only needs to be manufactured from various opaque plastic materials, metal materials, and alloy materials, and only needs to be attached to a pad portion side of the front portion by an appropriate method such as a method using an adhesive or a method using a screw. Specifically, the optical device receiving member may be attached to a pad portion side of the front portion, may be attached to the pad portion, may be integrated with the front portion, or may be integrated with the pad portion. The length of the optical device receiving member facing the light guide plate is preferably 20% to 100% of the length of the light guide plate in a width direction (height direction or vertical direction, corresponding to a Y-axis direction), but is not limited thereto.

In the display device according to the first and second aspects of the present disclosure including the preferable forms and configurations described above (hereinafter, these may be collectively referred to as "display device or the like of the present disclosure"), the two temple portions may be rotatably attached to both ends of the front portion through hinges, respectively, or the front portion may be integrated with the two temple portions. If necessary, a modern portion (leading cell portion) is attached to a distal end portion of each of the temple portions. The pad portion may be attached to the front portion. When the entire display device or the like of the present disclosure is viewed, the frame has substantially the same appearance as ordinary eyeglasses or sunglasses. A material constituting the frame including the pad portion may be the same as a material constituting ordinary eyeglasses or sunglasses, such as metal, alloy, plastic, or a combination thereof. A speaker or a headphone may be attached to each of the temple portions, or an imaging device may be attached to the front portion.

In the display device or the like of the present disclosure including the various preferable forms and configurations described above, the first deflecting unit and the second deflecting unit may be constituted by hologram diffraction grating films.

In a case where the first deflecting unit and the second deflecting unit are constituted by hologram diffraction grating films, the first deflecting unit diffracts and reflects light incident on the light guide plate, and the second deflecting unit diffracts and reflects light propagated by total reflection inside the light guide plate. The hologram diffraction grating films may be constituted by reflection type hologram diffraction grating films or transmission type hologram diffraction grating films. Alternatively, one of the hologram diffraction grating films may be constituted by a reflection type hologram diffraction grating film, and the other hologram diffraction grating film may be constituted by a transmission type hologram diffraction grating film. Note that examples of the reflection type hologram diffraction grating film include a reflection type volume hologram diffraction grating film. A first deflecting unit constituted by the reflection type volume hologram diffraction grating film may be referred to as a "first diffraction grating member" for convenience, and a second deflecting unit constituted by the reflection type volume hologram diffraction grating film may be referred to as a "second diffraction grating member" for convenience.

Alternatively, in a case where the first deflecting unit reflects all the light incident on the light guide plate, the first deflecting unit may be constituted by, for example, a light reflecting film (a kind of mirror) that is constituted by metal including alloy and reflects light incident on the light guide plate. Furthermore, in a case where the first deflecting unit reflects a part of light incident on the light guide plate, the first deflecting unit may be constituted by, for example, a multilayer laminated structure in which many dielectric laminated films are laminated, a half mirror, a polarization beam splitter, or a diffraction grating (for example, a hologram diffraction grating film). Meanwhile, in the second deflecting unit, parallel light propagated by total reflection inside the light guide plate is reflected or diffracted, and is emitted from the light guide plate in the state of parallel light. The second deflecting unit may be constituted by a multilayer laminated structure in which many dielectric laminated films are laminated, a half mirror, a polarization beam splitter, or a hologram diffraction grating film. In some cases, one of the first deflecting unit and the second deflecting unit may be disposed inside the light guide plate.

Moreover, in the display device or the like of the present disclosure including the various preferable configurations and forms described above, the light guide plate may be constituted by a transparent substrate. The light guide plate has two parallel surfaces (first surface and second surface) extending parallel to the axis (longitudinal direction or horizontal direction, corresponding to an X-axis direction) of the light guide plate. The width direction (height direction or vertical direction) of the light guide plate corresponds to the Y-axis direction. If a surface of the light guide plate on which light is incident is referred to as an incident surface and a surface of the light guide plate from which light is emitted is referred to as an emission surface, the second surface may constitute the light incident surface and the light emission surface, or the first surface may constitute the light incident surface and the second surface may constitute the light emission surface. An interference fringe of a hologram diffraction grating film extends substantially parallel to the Y-axis direction. Examples of a material constituting the light guide plate include glass including an optical glass such as a quartz glass or BK7, a soda lime glass, and a white plate glass, and a plastic material (for example, a polycarbonate resin, a laminated structure of a polycarbonate resin and an acrylic resin, a cycloolefin polymer, an amorphous polypropylene-based resin, and a styrene-based resin including an AS resin). The shape of the light guide plate is not limited to a flat plate, and may be a curved shape. The light guide plate as a whole is disposed closer to the center side of the face of an observer than the image forming device.

The optical device is a semi-transmission type (see-through type) device. Specifically, at least a portion of the optical device facing the eyeball (pupil) of an observer is made semi-transmissive (see-through), and an outside scene can be viewed through this portion (and further through a dimmer in a case where the dimmer is disposed) of the optical device. The display device or the like of the present disclosure may include one image display device (single eye type) or two image display devices (binocular type). In a case where a dimmer is disposed, in a binocular type, on the basis of a signal for displaying an image, a light transmittance of a partial region of the dimmer may be changed in both image display devices, or a light transmittance of a partial region of the dimmer may be changed in one of the image display devices.

Here, the term "semi-transmissive" may be used, and the term "semi-transmissive" does not mean that a half (50%) of incident light is transmitted or reflected, but means that a part of incident light is transmitted and the remaining light is reflected.

The image display device in the display device or the like of the present disclosure can display an image of a single color (for example, green). In addition, in this case, for example, by dividing an angle of view into two (more specifically, for example, by dividing an angle of view into two equal parts), the first deflecting unit may be formed by laminating two hologram diffraction grating films corresponding to groups of the angle of view divided into two, respectively. Alternatively, the first deflecting unit may be disposed on each of the first surface and the second surface of the light guide plate. Furthermore, in a case where a color image is displayed, the first diffraction grating member or the second diffraction grating member may be formed by laminating P layers of reflection type volume hologram diffraction grating films so as to correspond to diffraction reflection of P types of light beams having different P types (for example, P=3, and three types of red, green, and blue) of wavelength bands (or wavelengths). In each of the hologram diffraction grating films, an interference fringe corresponding to one type of wavelength band (or wavelength) is formed. Alternatively, in one hologram diffraction grating film, P types of interference fringes may be formed so as to correspond to diffraction reflection of P types of light beams having different P types of wavelength bands (or wavelengths). Alternatively, for example, a reflection type volume hologram diffraction grating film that diffracts and reflects light having a red wavelength band (or wavelength) may be disposed on a first light guide plate, a reflection type volume hologram diffraction grating film that diffracts and reflects light having a green wavelength band (or wavelength) may be disposed on a second light guide plate, a reflection type volume hologram diffraction grating film that diffracts and reflects light having a blue wavelength band (or wavelength) may be disposed on a third light guide plate, and the first light guide plate, the second light guide plate, and the third light guide plate may be laminated with a gap therebetween. The first light guide plate or the third light guide plate corresponds to the light guide plate. Alternatively, the first diffraction grating member or the second diffraction grating member may be formed by dividing an angle of view, for example, into three equal parts and laminating hologram diffraction grating films corresponding to the divided angles of view, respectively. In addition, by adopting these configurations, it is possible to increase diffraction efficiency, to increase a diffraction reception angle, and to optimize a diffraction angle when light having each wavelength band (or wavelength) is diffracted and reflected by the first diffraction grating member or the second diffraction grating member.

Examples of a material constituting the diffraction grating member include a photopolymer material. A constituent material and a basic structure of each of the first diffraction grating member and the second diffraction grating member including a reflection type volume hologram diffraction grating film only need to be the same as those of a conventional reflection type volume hologram diffraction grating film. The reflection type volume hologram diffraction grating film means a hologram diffraction grating film that diffracts and reflects only+1st order diffracted light. An interference fringe is formed from the inside to a surface of the diffraction grating member. A method for forming such an interference fringe itself only needs to be the same as a conventional formation method. Specifically, for example, by irradiating a member (for example, a photopolymer member) constituting the diffraction grating member with object light from a first predetermined direction on one side, and at the same time, by irradiating the member constituting the diffraction grating member with reference light from a second predetermined direction on the other side, it is only required to record an interference fringe formed by the object light and the reference light inside the member constituting the diffraction grating member. By appropriately selecting the first predetermined direction, the second predetermined direction, and the wavelengths of the object light and the reference light, it is possible to obtain a desired pitch of an interference fringe on a surface of the diffraction grating member and a desired inclination angle (slant angle) of the interference fringe. Here, the inclination angle of the interference fringe means an angle formed by a surface of the diffraction grating member and the interference fringe. In a case where the first diffraction grating member and the second diffraction grating member are each constituted by a laminated structure of P layers of reflection type volume hologram diffraction grating films, such a lamination of hologram diffraction grating films only needs to be performed by manufacturing each of P layers of hologram diffraction grating films separately, and then laminating (bonding) the P layers of hologram diffraction grating films using, for example, an ultraviolet curable adhesive. Furthermore, by manufacturing a single layer of hologram diffraction grating film using an adhesive photopolymer material and then sequentially sticking an adhesive photopolymer material onto the hologram diffraction grating film to manufacture a hologram diffraction grating film, the P layers of hologram diffraction grating films may be manufactured. By irradiating the manufactured hologram diffraction grating film with an energy ray, if necessary, a monomer remaining in the photopolymer material without being polymerized when the hologram diffraction grating film is irradiated with the object light and the reference light is polymerized and fixed. Furthermore, if necessary, a heat treatment is performed for stabilization.

In the image display device in the display device or the like of the present disclosure including the various preferable forms and configurations described above, the image forming device may have a plurality of pixels arranged in a two-dimensional matrix. Note that such a configuration of the image forming device is referred to as "image forming device with first configuration" for convenience.

Examples of the image forming device with first configuration include: an image forming device including a reflection type spatial light modulator and a light source; an image forming device including a transmission type spatial light modulator and a light source; and an image forming device including a light emitting element such as an organic electro luminescence (EL), an inorganic EL, a light emitting diode (LED), or a semiconductor laser element. Among these devices, the image forming device including a reflection type spatial light modulator and a light source and the image forming device including a light emitting element are preferable. Examples of the spatial light modulator include a light valve, a transmission type or reflection type liquid crystal display device such as a liquid crystal on silicon (LCOS), and a digital micromirror device (DMD). Examples of the light source include a light emitting element. Moreover, the reflection type spatial light modulator may include a liquid crystal display device and a polarization beam splitter that reflects a part of light emitted from a light source and guides the light to the liquid crystal display device, and transmits a part of the light reflected by the liquid crystal display device and guides the light to an optical system. Examples of the light emitting element constituting the light source include a red light emitting element, a green light emitting element, a blue light emitting element, and a white light emitting element. Alternatively, white light may be obtained by mixing colors of red light, green light, and blue light emitted from the red light emitting element, the green light emitting element, and the blue light emitting element using a light pipe and uniformizing brightness. Examples of the light emitting element include a semiconductor laser element, a solid state laser, and an LED. The number of pixels only needs to be determined on the basis of specifications required for the image display device, and examples of a specific value of the number of pixels include 320×240, 432×240, 640×480, 854×480, 1024×768, 1920×1080, and the like.

Alternatively, in the image display device in the display device or the like of the present disclosure including the preferable forms and configurations described above, the image forming device may include a light source and a scanning unit that scans parallel light emitted from the light source. Note that such a configuration of the image forming device is referred to as "image forming device with second configuration" for convenience.

Examples of the light source in the image forming device with second configuration include a light emitting element, and specific examples thereof include a red light emitting element, a green light emitting element, a blue light emitting element, and a white light emitting element. Alternatively, white light may be obtained by mixing colors of red light, green light, and blue light emitted from the red light emitting element, the green light emitting element, and the blue light emitting element using a light pipe and uniformizing brightness. Examples of the light emitting element include a semiconductor laser element, a solid state laser, and an LED. The number of pixels (virtual pixels) in the image forming device with second configuration only needs to be determined on the basis of specifications required for the image display device, and examples of a specific value of the number of pixels (virtual pixels) include 320×240, 432×240, 640×480, 854×480, 1024×768, 1920×1080, and the like. Furthermore, in a case where a color image is to be displayed and in a case where the light source includes a red light emitting element, a green light emitting element, and a blue light emitting element, color synthesis is preferably performed using, for example, a cross prism. Examples of the scanning unit include micro electro mechanical systems (MEMS) having a micro mirror rotatable in a two-dimensional direction and a galvanometer mirror, which horizontally and vertically scan light emitted from the light source.

In the image forming device with first configuration or the image forming device with second configuration, light converted into a plurality of parallel light beams by an optical system (optical system that converts emitted light into parallel light, and the optical system may be referred to as "parallel light emission optical system", and specific examples thereof include a collimate optical system and a relay optical system) is incident on the light guide plate. Such a requirement for obtaining parallel light is on the basis of necessity of saving optical wavefront information when the light is incident on the light guide plate even after the light is emitted from the light guide plate via the first deflecting unit and the second deflecting unit. In order to generate a plurality of parallel light beams, specifically, for example, it is only required to locate, for example, a light emitting portion of the image forming device at a position (location) of a focal length in the parallel light emission optical system. The parallel light emission optical system has a function of converting position information of a pixel into angle information in an optical system of the optical device. Examples of the parallel light emission optical system include an optical system having a positive optical power as a whole, such as a convex lens, a concave lens, a free cured surface prism, a hologram lens, or a combination thereof. A light shielding portion having an opening may be disposed between the parallel light emission optical system and the light guide plate in order to prevent undesired light emitted from the parallel light emission optical system from being incident on the light guide plate.

The display device or the like of the present disclosure may receive a signal for displaying an image in the image display device (a signal for forming a virtual image in the optical device) from the outside. In such a form, information and data regarding an image to be displayed on the image display device is recorded, stored, and saved, for example, in a so-called cloud computer or a server. By inclusion of a communication unit such as a mobile phone or a smartphone in the display device or by combination of the display device and the communication unit, various kinds of information and data can be transmitted and exchanged between the cloud computer or the server and the display device, and a signal based on various kinds of information and data, that is, a signal for displaying an image in the image display device (a signal for forming a virtual image in the optical device) can be received. Alternatively, a signal for displaying an image in the image display device (a signal for forming a virtual image in the optical device) may be stored in the display device. An image displayed on the image display device includes various kinds of information and various kinds of data. Alternatively, the display device may include an imaging device. An image imaged by the imaging device may be sent to a cloud computer or a server via a communication unit. The cloud computer or the server may retrieve various kinds of information and data corresponding to the image imaged by the imaging device. The various kinds of retrieved information and data may be sent to the display device via the communication unit, and may be displayed on the image display device.

When the image imaged by the imaging device is sent to the cloud computer or the server via the communication unit, the image imaged by the imaging device may be displayed on the image display device to be confirmed by the optical device. Specifically, an outer edge of a space region imaged by the imaging device may be displayed in a frame shape in the dimmer. Alternatively, the light shielding ratio of a region of the dimmer corresponding to the space region imaged by the imaging device may be higher than the light shielding ratio of a region of the dimmer corresponding to the outside of the space region imaged by the imaging device. In such a form, an observer sees the space region imaged by the imaging device darker than the outside of the space region imaged by the imaging device. Alternatively, the light shielding ratio of a region of the dimmer corresponding to the space region imaged by the imaging device may be lower than the light shielding ratio of a region of the dimmer corresponding to the outside of the space region imaged by the imaging device. In such a form, an observer sees the space region imaged by the imaging device brighter than the outside of the space region imaged by the imaging device. In addition, this makes it possible for an observer to easily and reliably recognize a position in the outside to be imaged by the imaging device.

A position in a region of the dimmer corresponding to the space region image by the imaging device is preferably calibrated. Specifically, for example, by inclusion of a mobile phone or a smartphone in the display device or by combination of the display device with the mobile phone, the smartphone, or a personal computer, the mobile phone, the smartphone, or the personal computer can display a space region imaged by the imaging device. In addition in a case where there is a difference between the space region displayed on the mobile phone, the smartphone, or the personal computer and a region of the dimmer corresponding to the space region imaged by the imaging device, by moving/rotating or enlarging/reducing a region of the dimmer corresponding to the space region imaged by the imaging device using a control circuit (for which a mobile phone, a smartphone, or a personal computer can be substituted) for controlling the light shielding ratio (light transmittance) of the dimmer, it is only required to eliminate the difference between the space region displayed on the mobile phone, the smartphone, or the personal computer and the region of the dimmer corresponding to the space region imaged by the imaging device.

The display device or the like of the present disclosure including the various modifications described above can be used, for example, for receiving/displaying an electronic mail; display of various kinds of information or the like in various sites on the Internet; display of various explanations, for example, for driving, operating, maintaining, or disassembling an observation object such as various devices, a symbol, a sign, a mark, an emblem, a design, or the like; display of various explanations concerning an observation object such as a person or an article, a symbol, a sign, a mark, an emblem, a design, or the like; display of a moving image and a still image; display of subtitles of a movie and the like; display of descriptive text concerning video synchronized with video and closed caption; and display of various explanations concerning an observation object in play, Kabuki, Noh, Kyogen, opera, concert, ballet, various dramas, an amusement park, a museum, a sightseeing spot, a holiday destination, tourist information, and the like, and descriptive text or the like for explaining contents thereof, progress status thereof, backgrounds thereof, and the like, and can be used for display of closed caption. In play, Kabuki, Noh, Kyogen, opera, concert, ballet, various dramas, an amusement park, a museum, a sightseeing spot, a holiday destination, tourist information, and the like, it is only required to display characters as an image relating to an observation object on the display device at an appropriate timing. Specifically, for example, in accordance with progress status of a movie or the like, or in accordance with progress status of a play or the like, an image control signal is sent to the display device, and an image is displayed on the display device on the basis of a predetermined schedule or time allocation by operation of an operator or under control of a computer or the like. Furthermore, various kinds of explanations concerning an observation object such as various devices, a person, or an article are displayed. If the imaging device images an observation object such as various devices, a person, or an article, and the display device analyzes the imaged contents, the display device can display previously-created various explanations concerning an observation object such as various devices, a person, or an article.

An image signal to the image forming device may include not only an image signal (for example, character data) but also, for example, brightness data (brightness information) concerning an image to be displayed, chromaticity data (chromaticity information), or brightness data and chromaticity data. The brightness data may correspond to brightness of a predetermined region including an observation object viewed through the optical device. The chromaticity data may correspond to chromaticity of a predetermined region including an observation object viewed through the optical device. In this way, by inclusion of brightness data concerning an image, brightness (lightness) of an image displayed can be controlled. By inclusion of chromaticity data concerning an image, chromaticity (color) of an image displayed can be controlled. By inclusion of brightness data and chromaticity data concerning an image, brightness (lightness) and chromaticity (color) of an image displayed can be controlled. In a case where brightness data corresponds to brightness of a predetermined region including an observation object viewed through the image display device, it is only required to set a value of brightness data such that the higher a value of brightness of a predetermined region including an observation object viewed through the image display device is, the higher a value of brightness of an image is (that is, the brighter an image is displayed). Furthermore, in a case where chromaticity data corresponds to chromaticity of a predetermined region including an observation object viewed through the image display device, it is only required to set a value of chromaticity data such that chromaticity of a predetermined region including an observation object viewed through the image display device has a roughly complementary color relationship with chromaticity of an image to be displayed. A complementary color refers to a combination of colors diametrically opposed to each other in a color circle. The complementary color also means a complementary color, for example, green for red, violet for yellow, and orange for blue. The complementary color also means a color to cause a decrease in color saturation by mixing a certain color with another color at an appropriate ratio, for example, white in a case of light and black in a case of an object. However, a complementary property in visual effects in parallel disposition is different from a complementary property in mixing. The complementary color is also referred to as a surplus color, a control color, or an opposite color. However, the opposite color directly indicates a color opposite to a complementary color, whereas a range indicated by the complementary color is slightly wider. A color combination of complementary colors has a synergistic effect for bringing mutual colors into prominence, and this is referred to as complementary color harmony.

The display device or the like of the present disclosure can constitute, for example, a head mounted display (HMD). In addition, this makes it possible to reduce the weight and size of the display device, to largely reduce discomfort when the display device is mounted, and further to reduce manufacturing cost. Alternatively, the display device or the like of the present disclosure can be applied to a head-up display (HUD) disposed in a cockpit of a vehicle or an aircraft, or the like. Specifically, in a HUD in which a virtual image forming region where a virtual image is formed on the basis of light emitted from an image forming device is disposed on a windshield of a cockpit of a vehicle or an aircraft, or the like, or in a HUD in which a combiner having a virtual image formation region where a virtual image is formed on the basis of light emitted from an image forming device is disposed on a windshield of a cockpit of a vehicle or an aircraft, or the like, in a case where the HUD includes a dimmer, the virtual image forming region and the combiner only need to overlap with at least a part of the dimmer. Alternatively, the display device or the like of the present disclosure can also be used as a stereoscopic displaying device. In this case, if necessary, it is only required to detachably attach a polarizing plate or a polarizing film to the optical device, or to stick the polarizing plate or the polarizing film to the optical device.

Example 1

Figure 1B:
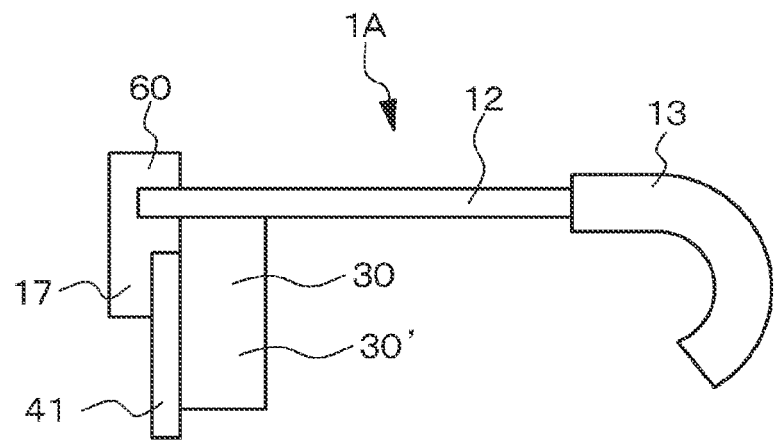
FIG. 1B is a schematic view of the display device of Example 1 as viewed from a side.
Figure 2:
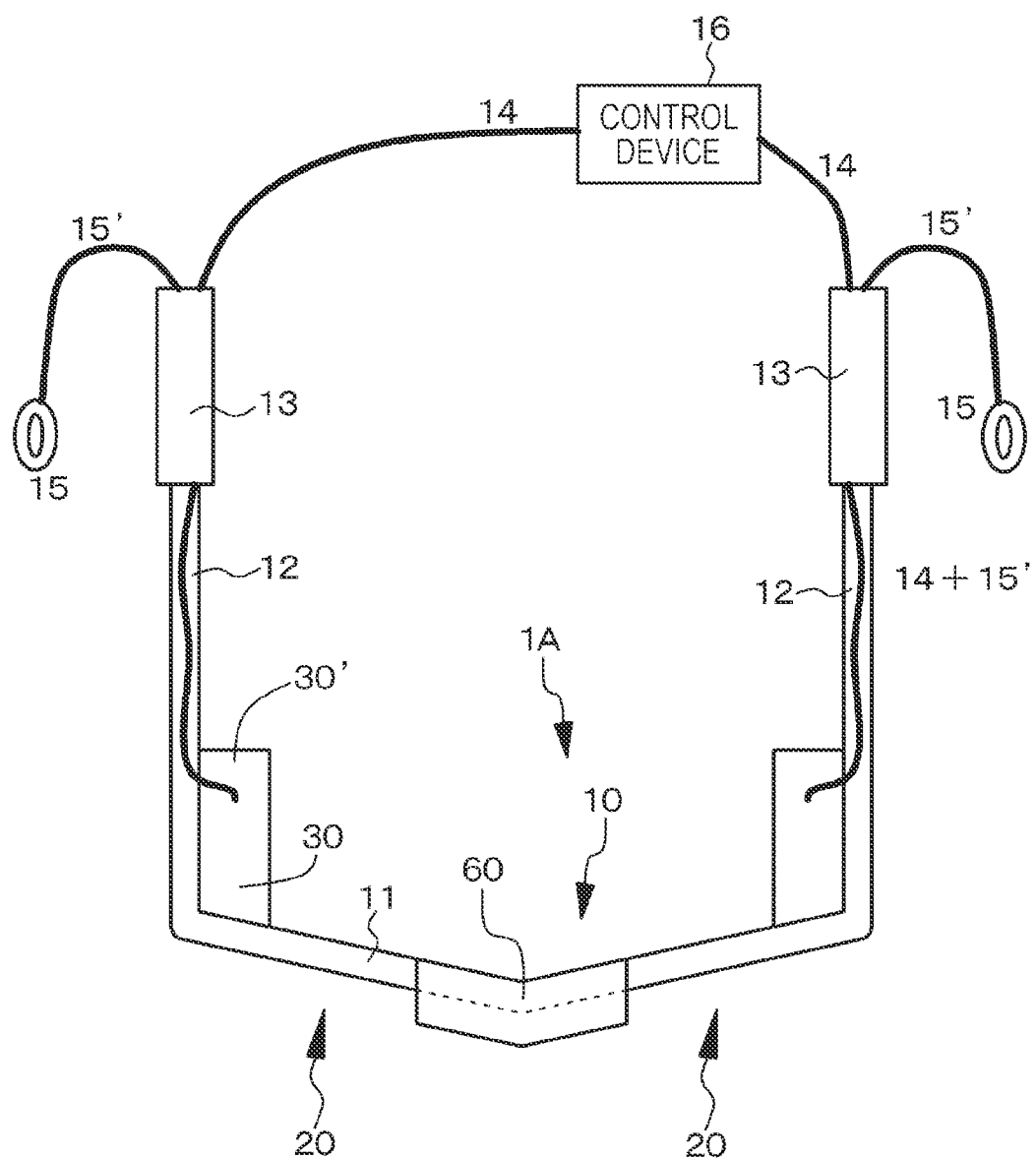
FIG. 2 is a schematic view of the display device of Example 1 as viewed from above.
Figure 3A:
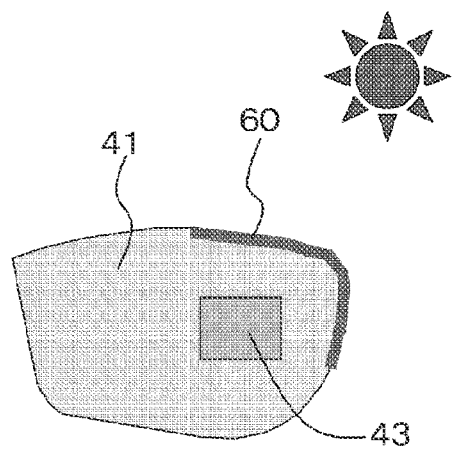
FIG. 3A is a schematic view for explaining an effect of a light shielding member included in the display device of Example 1.
Figure 3B:
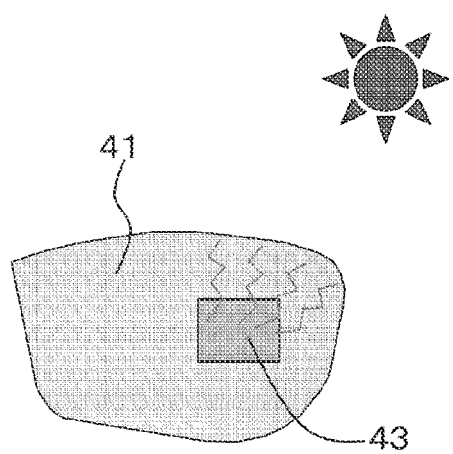
FIG. 3B is a schematic view for explaining a disadvantage in a conventional display device.
Figure 3C:
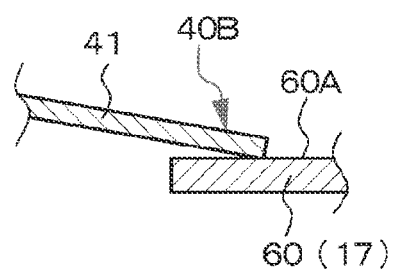
FIG. 3C is a schematic cross-sectional view of a light guide plate and the light shielding member included in the display device of Example 1 as viewed from above for explaining a positional relationship between the light guide plate and the light shielding member.

Example 1 relates to a display device according to the first aspect of the present disclosure. FIG. 1A illustrates a schematic view of the display device of Example 1 as viewed from the front. FIG. 1B illustrates a schematic view of the display device of Example 1 as viewed from a side (in which a light shielding member, a pad portion, and the like are not illustrated). FIG. 2 illustrates a schematic view of the display device of Example 1 as viewed from above. Furthermore, FIG. 3A illustrates a schematic view for explaining an effect of a light shielding member included in the display device of Example 1. FIG. 3B illustrates a schematic view for explaining a disadvantage in a conventional display device. FIG. 3C illustrates a schematic cross-sectional view of a light guide plate and the light shielding member included in the display device of Example 1 as viewed from above for explaining a positional relationship between the light guide plate and the light shielding member.

A display device 1A of Example 1 or a display device 1B of Example 2 described later is specifically a display device used for a head mounted display (HMD), the display device including:
  a frame 10 that includes a front portion 11 disposed in front of an observer 50, temple portions 12 extending from both ends of the front portion 11, and a pad portion 17, and is to be mounted on the head of the observer 50; and
  an image display device 20 attached to the frame 10, in which
  the image display device 20 includes:
  an image forming device 30; and
  an optical device 40 on which light emitted from the image forming device 30 is incident and from which the light is emitted toward the observer 50, and one end portion 40A of the optical device 40 is fixed to a temple portion side of the front portion 11.

In addition, in the display device 1A of Example 1, the other end portion 40B of the optical device 40 is disposed on a pad portion side of the front portion 11, and a light shielding member 60 that prevents external light from being incident on the other end portion 40B of the optical device 40 from above the other end portion 40B of the optical device 40 is attached to a pad portion side of the front portion 11. Furthermore, as illustrated in FIG. 3C, the other end portion 40B of the optical device 40 (specifically, a light guide plate 41) freely slides on a facing surface 60A of the light shielding member 60 facing the observer 50. In some cases, the other end portion 40B of the optical device 40 (specifically, the light guide plate 41) is located apart from the facing surface 60A of the light shielding member 60, that is, so as not to be in contact with the facing surface 60A.

Moreover, in the display devices 1A and 1B of Examples 1 and 2, one end portion 40A of the optical device 40 (specifically, the light guide plate 41) is attached to the image forming device 30 disposed on a temple portion side of the front portion 11. Specifically, one end portion 40A of the optical device 40 is attached to the image forming device 30, for example, using an adhesive.

The optical device 40 is a semi-transmission type (see-through type) device. Specifically, at least a portion of the optical device 40 facing the eyeball (pupil) 51 of the observer 50 is made semi-transmissive (see-through), and an outside scene can be viewed through this portion (and further through a dimmer described later in a case where the dimmer is disposed) of the optical device 40. The display devices 1A and 1B may each include two image display devices 20 (binocular type) as illustrated in the drawings, or may each include one image display device 20 (single eye type). The image forming device 30 displays an image (virtual image) of a single color (for example, blue).

Figure 8:
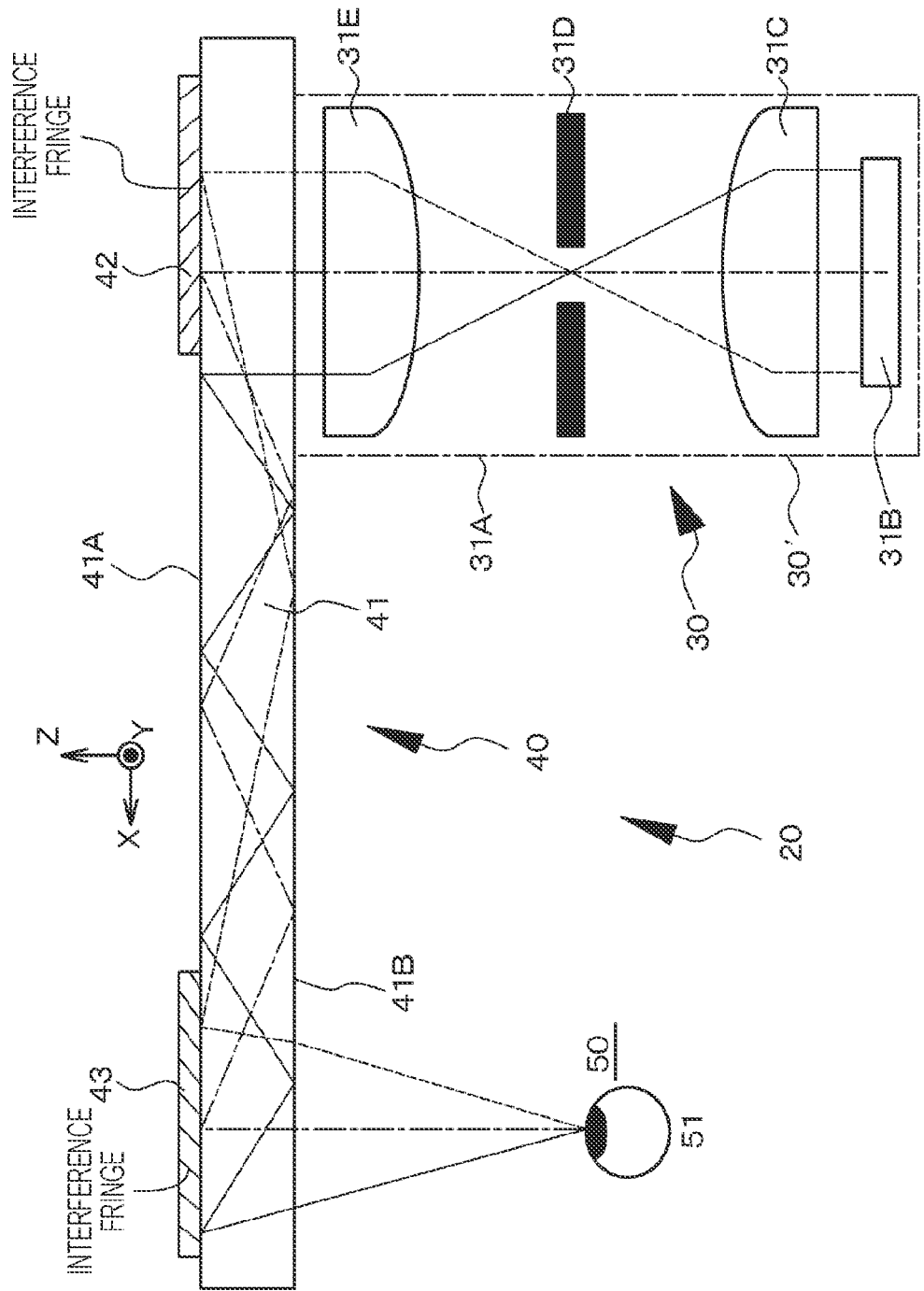
FIG. 8 is a view schematically illustrating arrangement of an image forming device and an optical device constituting a display device of Example 3.

Here, description will be made with reference to FIG. 8 schematically illustrating arrangement of an image forming device and an optical device. In the display devices 1A and 1B of Examples 1 and 2, the optical device 40 includes:

the light guide plate 41 in which light incident from the image forming device 30 is propagated by total reflection inside the light guide plate, and then the light is emitted toward the observer 50;

a first deflecting unit 42 that deflects the light incident on the light guide plate 41 such that the light incident on the light guide plate 41 is totally reflected inside the light guide plate 41; and a second deflecting unit 43 that deflects light propagated by total reflection inside the light guide plate 41 for emitting the light propagated by total reflection inside the light guide plate 41 from the light guide plate 41. That is, the light incident from the image forming device 30 is propagated by total reflection inside the light guide plate 41 and then emitted toward the observer 50. The light guide plate 41 as a whole is disposed closer to the center side of the face of the observer 50 than the image forming device 30.

The light guide plate 41 containing an optical glass or a plastic material has two parallel surfaces (first surface 41A and second surface 41B) extending parallel to a light propagation direction (X-direction) due to total reflection inside the light guide plate 41. The first surface 41A faces the second surface 41B. In addition, parallel light is incident on the second surface 41B corresponding to a light incident surface, propagated by total reflection inside the light guide plate, and then emitted from the second surface 41B corresponding to a light emission surface. However, the present disclosure is not limited thereto. The light incident surface may be constituted by the first surface 41A, and the light emission surface may be constituted by the second surface 41B.

Moreover, in the display devices 1A and 1B of Examples 1 and 2, the image forming device 30 is attached to a temple portion side of the front portion 11. Specifically, a casing 30' including the image forming device 30 therein is attached to the front portion 11. Note that the casing 30' may be attached to each of the temple portions 12 or may be attached from the front portion 11 to each of the temple portions 12. Attachment of the image forming device 30 (attachment of the casing 30') may be performed by an appropriate method such as a method using a screw, for example.

The light shielding member 60 only needs to be manufactured from various opaque plastic materials, metal materials, and alloy materials, and only needs to be attached to a pad portion side of the front portion 11 by an appropriate method such as a method using an adhesive or a method using a screw. Specifically, the light shielding member 60 may be attached to a pad portion side of the front portion 11 or may be attached to the pad portion 17. Alternatively, the light shielding member 60 may be integrated with the front portion 11, or may be integrated with the pad portion 17. In the illustrated example, the light shielding member 60 has a structure integrated with the pad portion 17, and the pad portion 17 integrated with the light shielding member 60 is attached to the front portion 11. The length of a portion of the light shielding member 60 located above the light guide plate 41 is preferably 10% to 100% of the length of the axis of the light guide plate 41, more preferably 45% to 65% thereof, and specifically 57% thereof.

In the display devices 1A and 1B of Examples 1 and 2, each of the two temple portions 12 is integrated with the front portion 11. Note that the temple portions 12 may be rotatably attached to end portions of the front portion 11 through hinges, respectively. That is, the frame 10 includes the front portion 11 disposed in front of the observer 50, the two temple portions 12 extending from both ends of the front portion 11, and a modern portion (also referred to as a leading cell, an earmuff, or an ear pad) 13 attached to a distal end portion of each of the temple portions 12. When the whole of each of the display devices 1A and 1B of Examples 1 and 2 is viewed, the frame 10 has substantially the same appearance as ordinary eyeglasses or sunglasses. A material constituting the pad portion 17, the light shielding member 60, or the frame 10 may be the same as a material constituting ordinary eyeglasses or sunglasses, such as metal, alloy, plastic, or a combination thereof.

Moreover, wiring (signal line, power supply line, or the like) 14 extending from the image forming device 30 extends to the outside from a distal end portion of the modern portion 13 via the inside of each of the temple portions 12 and the inside of the modern portion 13, and is connected to a control device (control circuit or control unit) 16. Moreover, the image forming device 30 includes a headphone portion 15. Headphone portion wiring 15' extending from the image forming device 30 extends from a distal end portion of the modern portion 13 to the headphone portion 15 via the inside of each of the temple portions 12 and the inside of the modern portion 13. More specifically, the headphone portion wiring 15' extends from a distal end portion of the modern portion 13 to the headphone portion 15 so as to go around a back side of the auricle (auditory capsule). With such a configuration, an impression that the headphone portion 15 or the headphone portion wiring 15' is disorderedly disposed is not given, and a simple display device can be obtained.

As described above, the wiring (signal line, power supply line, or the like) 14 is connected to the control device (control circuit) 16. The control device 16 includes, for example, an image information storage device (not illustrated). In addition, the control device 16 performs processing for image display. Each of the control device 16 and the image information storage device may include a well-known circuit.

In the display devices 1A and 1B of Examples 1 and 2, the first deflecting unit (first diffraction grating member) 42 and the second deflecting unit (second diffraction grating member) 43 are constituted by hologram diffraction grating films. In addition, the first deflecting unit 42 diffracts and reflects light incident on the light guide plate 41, and the second deflecting unit 43 diffracts and reflects light propagated by total reflection inside the light guide plate 41. The hologram diffraction grating film is constituted by, for example, a reflection type hologram diffraction grating film, specifically, a reflection type volume hologram diffraction grating film. The light guide plate 41 is constituted by a transparent substrate containing glass or resin. The second surface 41B of the light guide plate 41 constitutes an incident surface. The first deflecting unit (first diffraction grating member) 42 and the second deflecting unit (second diffraction grating member) 43 are disposed on the first surface 41A of the light guide plate 41 facing the second surface 41B.

The image display device 20 will be described in detail in Examples 3 to 6.

In the display device of Example 1, the light shielding member is attached to a pad portion side of the front portion such that the sunlight is not incident on the other end portion of the optical device from above the other end portion of the optical device. Therefore, even in a case where the sun is located above the head of an observer and the optical device is directly irradiated with the sunlight, the sunlight is not incident on an end face of the other end portion of the optical device. This state is schematically illustrated in FIG. 3A. Therefore, it is possible to prevent occurrence of such a disadvantage that stray light is generated inside the optical device to deteriorate the quality of an image. Note that in a conventional display device in which the optical device includes no light shielding member, in a case where the sun is located above the head of an observer and the optical device is directly irradiated with the sunlight, the sunlight is incident on an end face of the other end portion of the optical device from above the other end portion of the optical device to generate stray light. This state is schematically illustrated in FIG. 3B. Furthermore, since the mass of the optical device is not added to the pad portion, or is slightly added to the pad portion even if the mass is applied, the nose of an observer is not hurt, and the observer has an excellent display device mounting feel.

Figure 4:
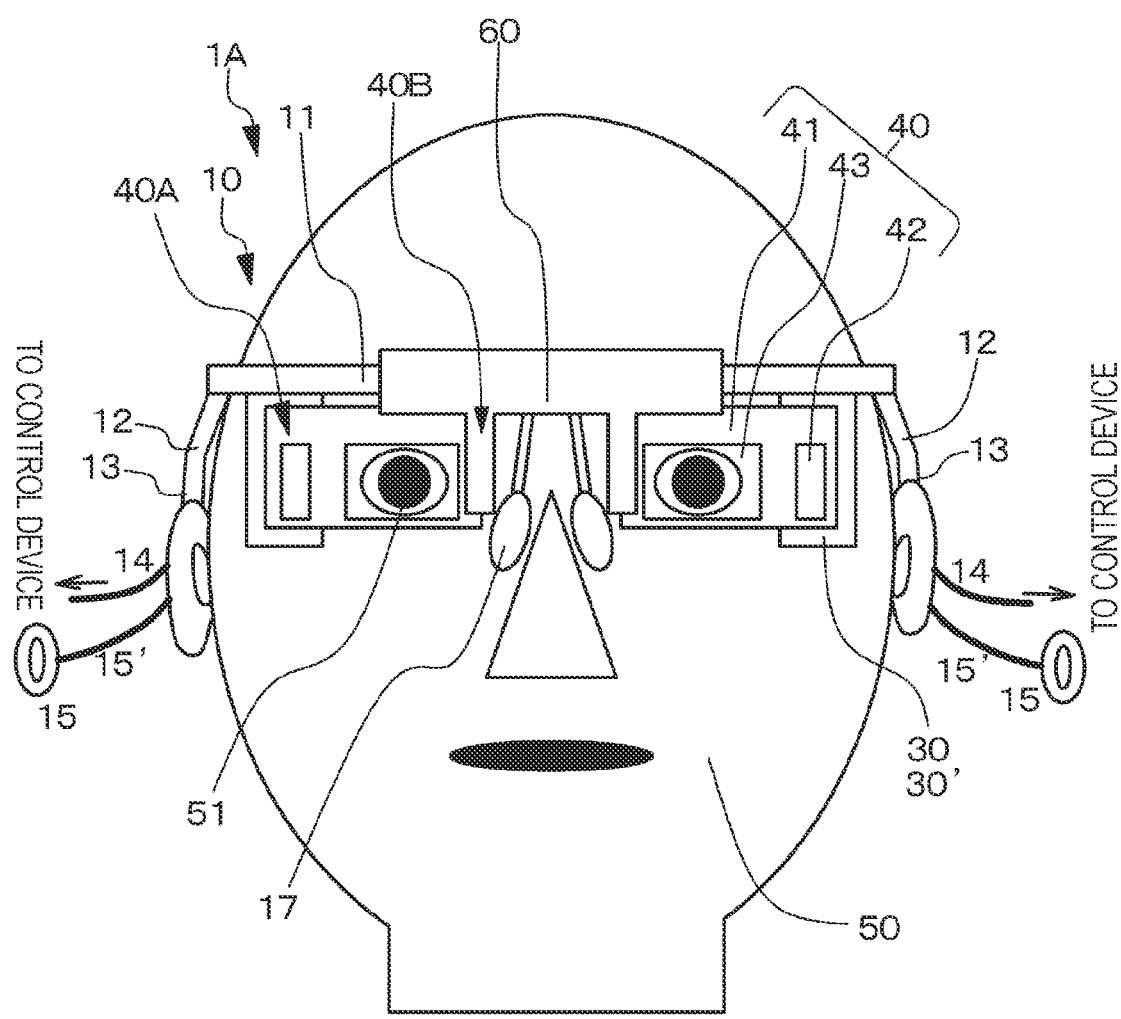
FIG. 4 is a schematic view of a modification of the display device of Example 1 as viewed from the front.

As illustrated in a schematic view of a modification of the display device of Example 1 as viewed from the front in FIG. 4, the light shielding member 60 may be attached to a pad portion side of the front portion 11, and the pad portion 17 may also be attached to the front portion 11.

Example 2

Figure 5:
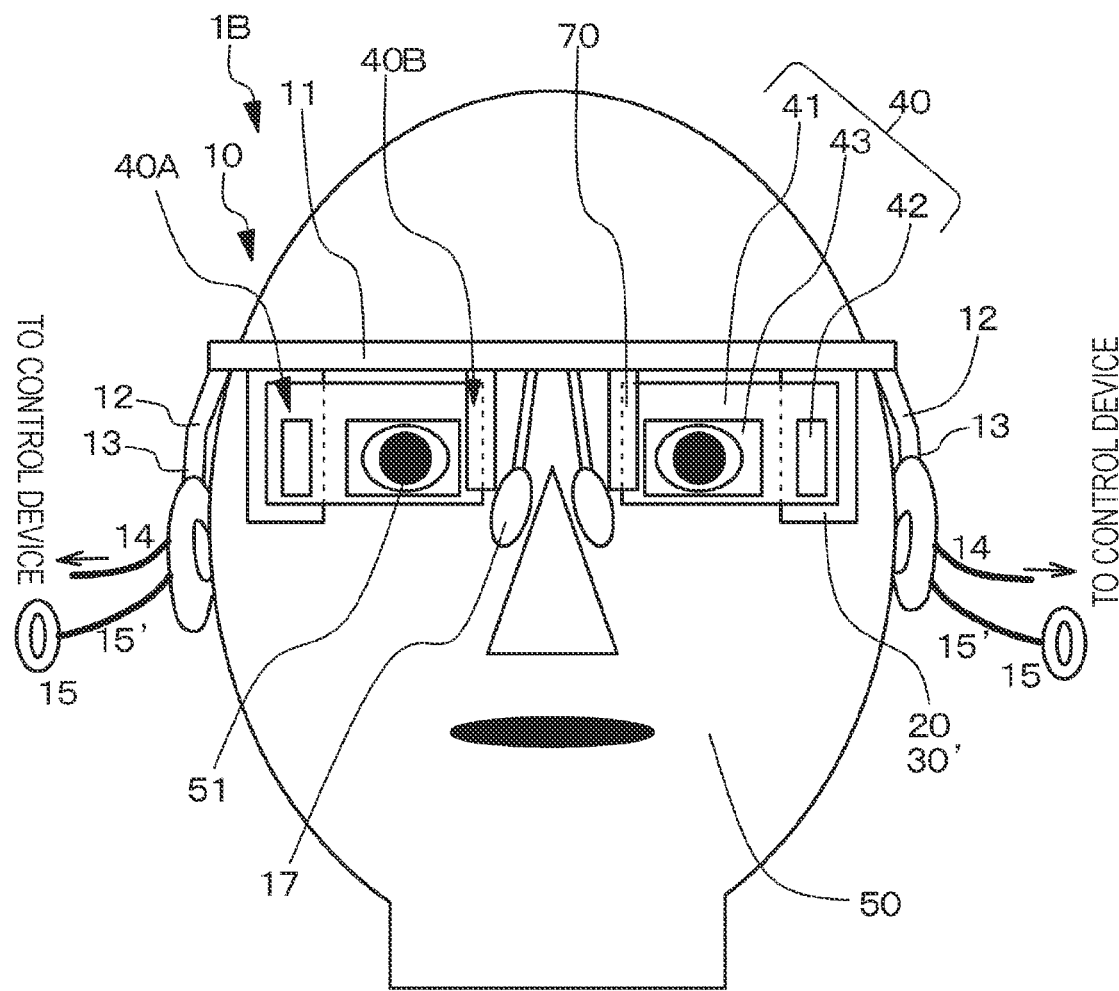
FIG. 5 is a schematic view of a display device of Example 2 as viewed from the front.
Figure 6A:
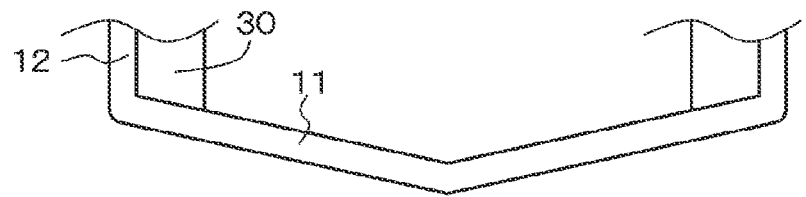
FIGS. 6A and 6C are views of the display device of Example 2 as viewed from above when the display device of Example 2 is mounted on the head of an observer.
Figure 6B:
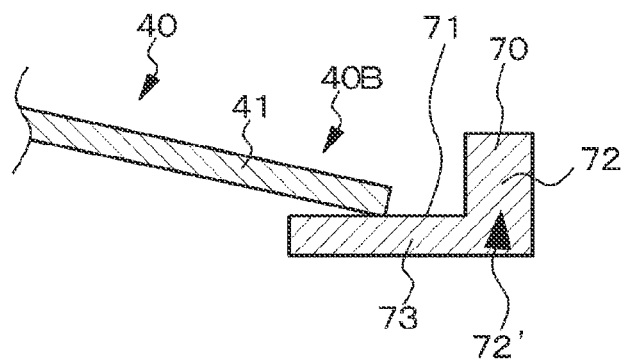
FIGS. 6B and 6D are schematic cross-sectional views of a light guide plate and an optical device receiving member included in the display device of Example 2 as viewed from above for explaining a positional relationship between the light guide plate and the optical device receiving member.
Figure 6C:
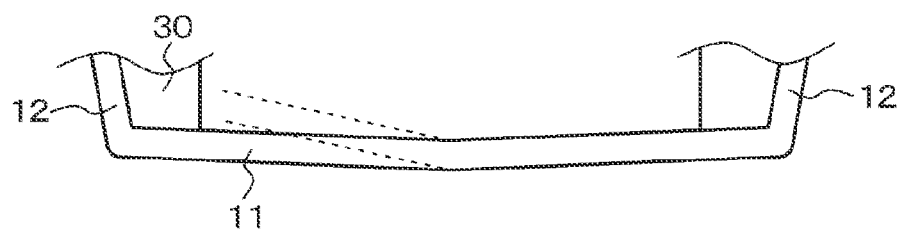
Figure 6D:
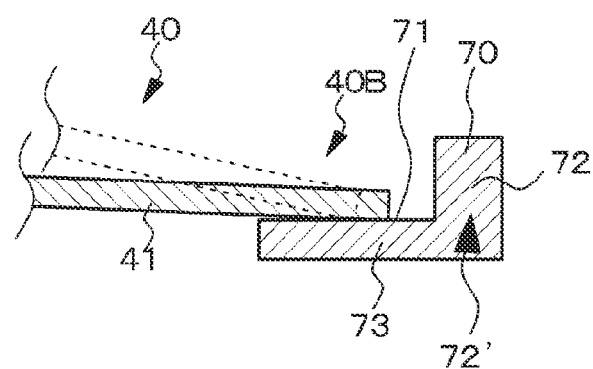
Figure 7A:
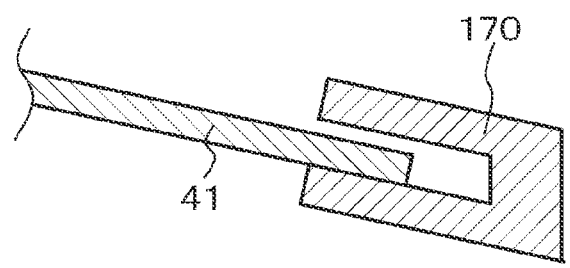
FIGS. 7A and 7B are schematic cross-sectional views of a light guide plate and a rim included in a conventional display device as viewed from above for explaining a positional relationship between the light guide plate and the rim.
Figure 7B:
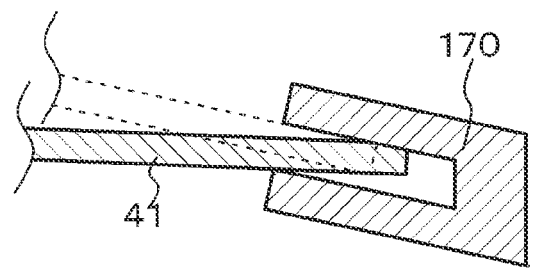

Example 2 relates to a display device according to the second aspect of the present disclosure. FIG. 5 illustrates a schematic view of the display device of Example 2 as viewed from the front. FIGS. 6A and 6C illustrate views of the display device of Example 2 as viewed from above when the display device of Example 2 is mounted on the head of an observer. FIGS. 6B and 6D illustrate schematic cross-sectional views of a light guide plate and an optical device receiving member included in the display device of Example 2 as viewed from above for explaining a positional relationship between the light guide plate and the optical device receiving member. Furthermore, FIGS. 7A and 7B illustrate schematic cross-sectional views of a light guide plate and a rim included in a conventional display device as viewed from above for explaining a positional relationship between the light guide plate and the rim.

In the display device 1B of Example 2, the other end portion 40B of the optical device 40 is disposed on a pad portion side of the front portion 11 and freely slides on the front portion 11. Specifically, an optical device receiving member 70 is attached to a pad portion side of the front portion 11, and the other end portion 40B of the optical device 40 freely slides on the optical device receiving member 70. Here,
the optical device receiving member 70 is constituted by a member having an L-shaped cross section when being cut with a virtual horizontal plane (see FIGS. 6B and 6D),
a first portion 72 of the optical device receiving member 70, corresponding to an L-shaped vertical bar, extends in a vertical direction facing the observer 50,
a second portion 73 of the optical device receiving member 70, corresponding to an L-shaped horizontal bar extending from an end portion 72' of the first portion 72 of the optical device receiving member 70 farther from the observer 50, extends to a temple portion side of the front portion 11, and
the other end portion 40B of the optical device 40 freely slides on a facing surface 71 of the second portion of the optical device receiving member 70 facing the observer 50.

The optical device receiving member 70 only needs to be manufactured from various opaque plastic materials, metal materials, and alloy materials, and only needs to be attached to a pad portion side of the front portion 11 by an appropriate method such as a method using an adhesive or a method using a screw. Specifically, the optical device receiving member 70 may be attached to a pad portion side of the front portion 11, may be attached to the pad portion 17, may be integrated with the front portion 11, or may be integrated with the pad portion. In the illustrated example, the optical device receiving member 70 is attached to a pad portion side of the front portion 11. The pad portion 17 is attached to the front portion 11. The length of the optical device receiving member 70 facing the light guide plate 41 is preferably 20% to 100% of the length of the light guide plate 41 in a width direction, and
may be specifically 70%.

As described above, FIG. 6A illustrates a state in which the display device 1B is mounted on the head of the observer 50 under a condition the same as or close to a design condition of the display device 1B as a view of the display device 1B as viewed from above. Note that the optical device receiving member 70 and the pad portion 17 are not illustrated in FIGS. 6A and 6C. Meanwhile, FIG. 6C illustrates a state in which the display device 1B is mounted on the head of the observer 50 under a condition larger than the design condition of the display device 1B as a view of the display device 1B as viewed from above. In addition, in this case, as illustrated in FIG. 6C, each of the temple portions 12 expands outward. Note that FIG. 6C illustrates a state in which the display device 1B is mounted on the head of the observer 50 under a condition the same as or close to the design condition of the display device 1B by a dotted line. As a result, in such a case, a stress is applied to a front portion of the frame 10, and a region of the front portion of the frame 10 between each of the temple portions 12 and the pad portion 17 is distorted.

In a conventional display device, as illustrated in FIGS. 7A and 7B, an end portion of the light guide plate 41 is housed in a recess of the rim 170. When each of the temple portions 12 spreads outward, the position of the light guide plate 41 changes from a state indicated by a dotted line to a state indicated by a solid line in FIG. 7B. As a result, the end portion of the light guide plate 41 comes into strong contact with the recess of the rim 170. A stress is also applied to the light guide plate 41. The light guide plate 41 is deformed, and an image observed by an observer is also distorted.

Meanwhile, as described above, in the display device 1B of Example 2, the other end portion 40B of the optical device 40 is disposed on a pad portion side of the front portion 11 and freely slides on the front portion 11. Therefore, when each of the temple portions 12 spreads outward, the position of the light guide plate 41 changes from a state indicated by a solid line in FIG. 6B (a dotted line in FIG. 6D) to a state indicated by a solid line in FIG. 6D. However, an end portion of the light guide plate 41 freely slides on the optical device receiving member 70. Therefore, no stress is applied to the light guide plate 41, and the light guide plate 41 is not deformed. Therefore, an image observed by an observer is not distorted. Note that the other end portion 40B of the optical device 40 (specifically, the light guide plate 41) may be apart from the facing surface 71 of the optical device receiving member 70, that is, may be in no contact with the facing surface 71 depending on the position of the other end portion 40B.

As described above, in the display device of Example 2, the other end portion of the optical device is disposed on a pad portion side of the front portion and freely slides on the front portion. Therefore, when the display device is mounted on the head of an observer, even if each of the temple portions spreads outward, the optical device is unlikely to be distorted, and the quality of an image observed by the observer is not significantly affected. Furthermore, since the mass of the optical device is not added to the pad portion, or is slightly added to the pad portion even if the mass is applied, the nose of an observer is not hurt, and the observer has an excellent display device mounting feel.

The configuration and structure of the display device of Example 2 can be similar to those of the display devices described in Example 1 except for the above-described points, and therefore detailed description thereof will be omitted.

Example 3

In Examples 3 to 5, an image forming device and an optical device will be described. In Example 3, an image forming device and an optical device constituting the display device described in Example 1 will be described. Arrangement of the image forming device and the optical device is schematically illustrated in FIG. 8.

In the display device of Example 3, specifically, the first deflecting unit 42 and the second deflecting unit 43 are disposed on (specifically, stuck to) a surface of the light guide plate 41 (specifically, the first surface 41A of the light guide plate 41). In addition, the first deflecting unit 42 diffracts and reflects light incident on the light guide plate 41, and the second deflecting unit 43 diffracts and reflects light propagated by total reflection inside the light guide plate 41. As described above, each of the first deflecting unit 42 and the second deflecting unit 43 is constituted by a diffraction grating member, specifically a reflection type diffraction grating member, more specifically a reflection type volume hologram diffraction grating member. In the following description, a first deflecting unit constituted by a hologram diffraction grating member is referred to as a "first diffraction grating member 42" for convenience, and a second deflecting unit constituted by a hologram diffraction grating member is referred to as a "second diffraction grating member 43" for convenience.

In addition, in Example 3 or Example 4 described later, each of the first diffraction grating member 42 and the second diffraction grating member 43 is constituted by a single diffraction grating layer. In each diffraction grating layer containing a photopolymer material, an interference fringe corresponding to one type of wavelength band (or wavelength) is formed, and is manufactured by a conventional method. A pitch of the interference fringe formed in the diffraction grating layer (optical diffraction element) is constant, and the interference fringe is linear and parallel to the Y direction. The axes of the first diffraction grating member 42 and the second diffraction grating member 43 are parallel to the X direction, and the normal lines thereof are parallel to the Z direction.

Figure 9A:
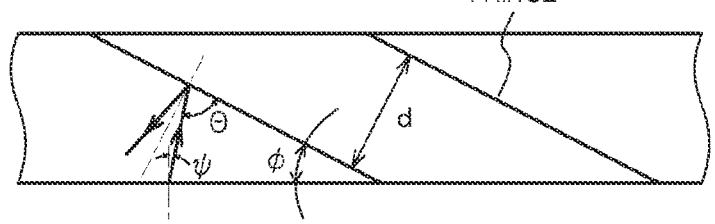
FIG. 9A is an enlarged schematic partial cross-sectional view of a reflection type volume hologram diffraction grating film.

FIG. 9A illustrates an enlarged schematic partial cross-sectional view of a reflection type volume hologram diffraction grating member. In the reflection type volume hologram diffraction grating member, an interference fringe having an inclination angle (slant angle) φ is formed. The inclination angle φ refers to an angle formed by a surface of the reflection type volume hologram diffraction grating member and an interference fringe. The interference fringe is formed from the inside to a surface of the reflection type volume hologram diffraction grating member. The interference fringe satisfies a Bragg condition. The Bragg condition means a condition satisfying the following formula (A). In formula (A), m represents a positive integer, λ represents a wavelength, d represents a pitch of a lattice plane (an interval in a normal direction of a virtual plane including an interference fringe), and Θ represents a complementary angle of an angle incident on the interference fringe. Furthermore, a relationship among Θ, an inclination angle φ, and an incident angle ψ in a case where light enters a diffraction grating member at the incident angle ψ is as illustrated in formula (B).

$$m \cdot \lambda = 2 \cdot d \cdot \sin(\Theta) \tag{A}$$

$$\Theta = 90° - (\varphi + \psi) \tag{B}$$

As described above, the first diffraction grating member 42 is disposed on (bonded to) the first surface 41A of the light guide plate 41, and diffracts and reflects parallel light incident on the light guide plate 41 such that the parallel light incident on the light guide plate 41 through the second surface 41B is totally reflected inside the light guide plate 41. Moreover, as described above, the second diffraction grating member 43 is disposed on (bonded to) the first surface 41A of the light guide plate 41, diffracts and reflects the parallel light propagated by total reflection inside the light guide plate 41, and emits the parallel light from the light guide plate 41 through the second surface 41B in the form of parallel light.

In addition, the parallel light is propagated by total reflection inside the light guide plate 41 and then emitted. At this time, the light guide plate 41 is thin, and an optical path through which light travels inside the light guide plate 41 is long. Therefore, the number of times of total reflection before the light reaches the second diffraction grating member 43 differs depending on an angle of view. More specifically, in the parallel light incident on the light guide plate 41, the number of times of reflection of the parallel light incident at an angle in a direction approaching the second diffraction grating member 43 is smaller than the number of times of reflection of the parallel light incident on the light guide plate 41 at an angle in a direction away from the second diffraction grating member 43. This is because the parallel light diffracted and reflected by the first diffraction grating member 42 and incident on the light guide plate 41 at an angle in a direction approaching the second diffraction grating member 43 has a smaller angle formed with the normal line of the light guide plate 41 when light propagated inside the light guide plate 41 collides with an inner surface of the light guide plate 41 than the parallel light incident on the light guide plate 41 at an angle in the opposite direction thereto. Furthermore, the shape of an interference fringe formed inside the second diffraction grating member 43 and the shape of an interference fringe formed inside the first diffraction grating member 42 have a symmetrical relationship with respect to a virtual plane perpendicular to the axis of the light guide plate 41. A surface of each of the first diffraction grating member 42 and the second diffraction grating member 43 not facing the light guide plate 41 may be covered with a transparent resin plate or a transparent resin film, and the first diffraction grating member 42 and the second diffraction grating member 43 may be prevented from being damaged. Furthermore, a transparent protective film may be stuck to the second surface 41B to protect the light guide plate 41.

Basically, the light guide plate 41 in Example 4 described later has the same configuration and structure as those of the light guide plate 41 described above.

In Example 3 or Example 5 described later, the image forming device 30 is the image forming device with first configuration and has a plurality of pixels arranged in a two-dimensional matrix. Specifically, the image forming device 30 includes an organic EL display device 31B. An image emitted from the organic EL display device 31B passes through a first convex lens 31C constituting a lens system, further passes through a second convex lens 31E constituting the lens system, and is converted into parallel light to travel toward the light guide plate 41. A front focal point $f_{2F}$ of the second convex lens 31E is located at a rear focal point $f_{1B}$ of the first convex lens 31C. Furthermore, a diaphragm 31D is disposed at the position of the rear focal point $f_{1B}$ of the first convex lens 31C (the front focal point $f_{2F}$ of the second convex lens 31E). The diaphragm 31D corresponds to an image emitting portion. The entire image forming device 30 is housed in a casing 31A (casing 30'). The casing 31A is attached to the frame 10 by an appropriate means. The organic EL display device 31B includes a plurality of (for example, 640×480) pixels (organic EL elements) arranged in a two-dimensional matrix.

Figure 9B:
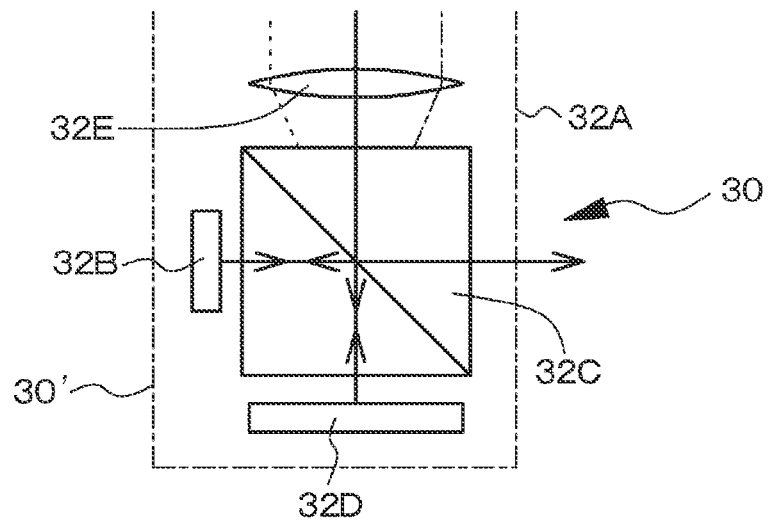
FIG. 9B is a view schematically illustrating an image forming device constituting a modification of the display device of Example 3.

Alternatively, as illustrated in FIG. 9B, the image forming device 30 is the image forming device with first configuration and has a plurality of pixels arranged in a two-dimensional matrix. Specifically, the image forming device 30 includes a reflection type spatial light modulator and a light source 32B including a light emitting diode that emits white light. The entire image forming device 30 is housed in a casing 32A (indicated by a chain line in FIG. 9B), and the casing 32A (casing 30') has an opening (not illustrated). Light is emitted from the optical system (parallel light emission optical system or collimate optical system 32E) through the opening. The casing 32A is attached to the frame 10 by an appropriate means. The reflection type spatial light modulator includes a liquid crystal display device (LCD) 32D constituted by LCOS as a light valve. Moreover, the reflection type spatial light modulator includes a polarization beam splitter 32C that reflects a part of light emitted from the light source 32B and guides the light to the liquid crystal display device 32D, and transmits a part of the light reflected by the liquid crystal display device 32D and guides the light to the optical system 32E. The liquid crystal display device 32D includes a plurality of (for example, 640×480) pixels (liquid crystal cells or liquid crystal display elements) arranged in a two-dimensional matrix. The polarization beam splitter 32C has a well-known configuration and structure. Unpolarized light emitted from the light source 32B collides with the polarization beam splitter 32C. In the polarization beam splitter 32C, a P-polarized component passes and is emitted outside the system. Meanwhile, an S-polarized component is reflected by the polarization beam splitter 32C, is incident on the liquid crystal display device 32D, is reflected inside the liquid crystal display device 32D, and is emitted from the liquid crystal display device 32D. Here, of the light emitted from the liquid crystal display device 32D, light emitted from a pixel displaying "white" contains a large amount of P-polarized component, and light emitted from a pixel displaying "black" contains a large amount of S-polarized component. Therefore, of the light that is emitted from the liquid crystal display device 32D and collides with the polarization beam splitter 32C, the P-polarized component passes through the polarization beam splitter 32C and is guided to the optical system 32E. Meanwhile, the S-polarized component is reflected by the polarization beam splitter 32C and returned to the light source 32B. The optical system 32E includes, for example, a convex lens. In order to generate parallel light, the image forming device 30 (more specifically, the liquid crystal display device 32D) is disposed at a position (location) of a focal length in the optical system 32E. An image emitted from the image forming device 30 reaches the pupil 51 of the observer 50 via the optical device 40.

Information and data regarding an image displayed on the image display device 20 or a signal to be received by a receiving device is recorded, kept, and stored, for example, in a so-called cloud computer or a server. By inclusion of a communication unit (sending/receiving device) such as a mobile phone or a smartphone in the display device 1A, 1B or by incorporation of a communication unit (receiving device) into the control device (control circuit or control unit) 16 included in the display device 1A, 1B, various kinds of information, data, and signals can be transmitted and exchanged between the cloud computer or the server and the display device 1A, 1B via the communication unit, a signal based on various kinds of information and data, that is, a signal for displaying an image in the image display device 20 can be received, and the receiving device can receive the signal.

Specifically, if an observer inputs a request for "information" to be obtained to a mobile phone or a smartphone, the mobile phone or the smartphone accesses a cloud computer or a server to obtain "information" from the cloud computer or the server. In this way, the control device 16 receives a signal for displaying an image in the image display device 20. The control device 16 performs well-known image processing on the basis of this signal, and displays "information" in the image forming device 30 as an image. The image of "information" is displayed as a virtual image at a predetermined position controlled by the control device 16 on the basis of light emitted from the image forming device 30 in the light guide plate 41. That is, a virtual image is formed in a part of the virtual image forming region (second deflecting unit 43).

In some cases, a signal for displaying an image in the image display device 20 may be stored in the display device 1A, 1B (specifically, the control device 16).

Alternatively, an image imaged by a camera (not illustrated) included in the display device 1A, 1B may be sent to a cloud computer or a server via a communication unit. The cloud computer or the server may retrieve various kinds of information and data corresponding to the image imaged by the camera. The various kinds of information and data retrieved may be sent to the display device 1A, 1B via the communication unit. An image of the various kinds of information and data retrieved may be displayed on the image display device 20. In addition, if input of "information" is performed together with such a form, for example, information such as a place where an observer is located or a direction in which the observer is facing can be weighted. Therefore, "Information" can be displayed on the image forming device 30 with higher accuracy.

Example 4

Figure 10:
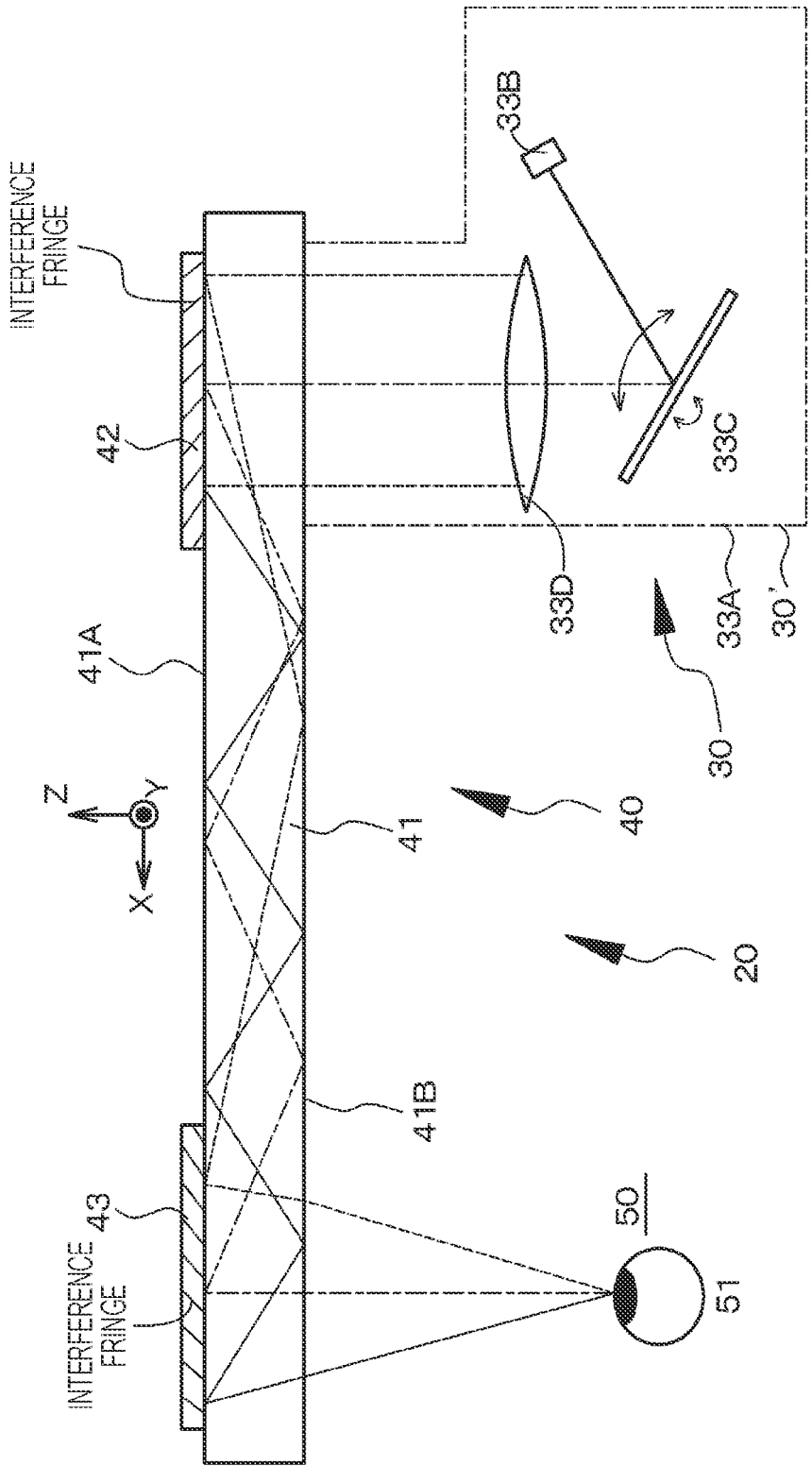
FIG. 10 is a view schematically illustrating arrangement of an image forming device and an optical device constituting a display device of Example 4.

As illustrated in a conceptual view of the image display device 20 in a display device (head mounted display) of Example 4 in FIG. 10, the image forming device 30 is constituted by the image forming device with second configuration in Example 4. That is, the image forming device 30 includes a light source 33B, a scanning unit 33C that scans parallel light emitted from the light source 33B two-dimensionally, and a lens system 33D that converts light emitted from the light source 33B into parallel light. The entire image forming device 30 is housed in a casing 33A (casing 30'), and the casing 33A has an opening (not illustrated). Light is emitted from the lens system 33D via the opening. In addition, the casing 33A is attached to the frame 10 by an appropriate means.

The light source 33B is constituted by, for example, a semiconductor laser element. In addition, light emitted from the light source 33B is converted into parallel light by a lens (not illustrated). The parallel light is horizontally and vertically scanned by the scanning unit 33C including a MEMS mirror that can make a micromirror rotatable in a two-dimensional direction and can scan incident parallel light two-dimensionally, and formed into a kind of two-dimensional image to generate virtual pixels (the number of pixels can be the same as, for example, that of Example 3). Then, then, the light from the virtual pixels (the scanning unit 33C corresponding to an image emitting portion) passes through the lens system 33D having a positive optical power, and a light flux that has been converted into parallel light is incident on the light guide plate 41.

Example 5

Figure 11:
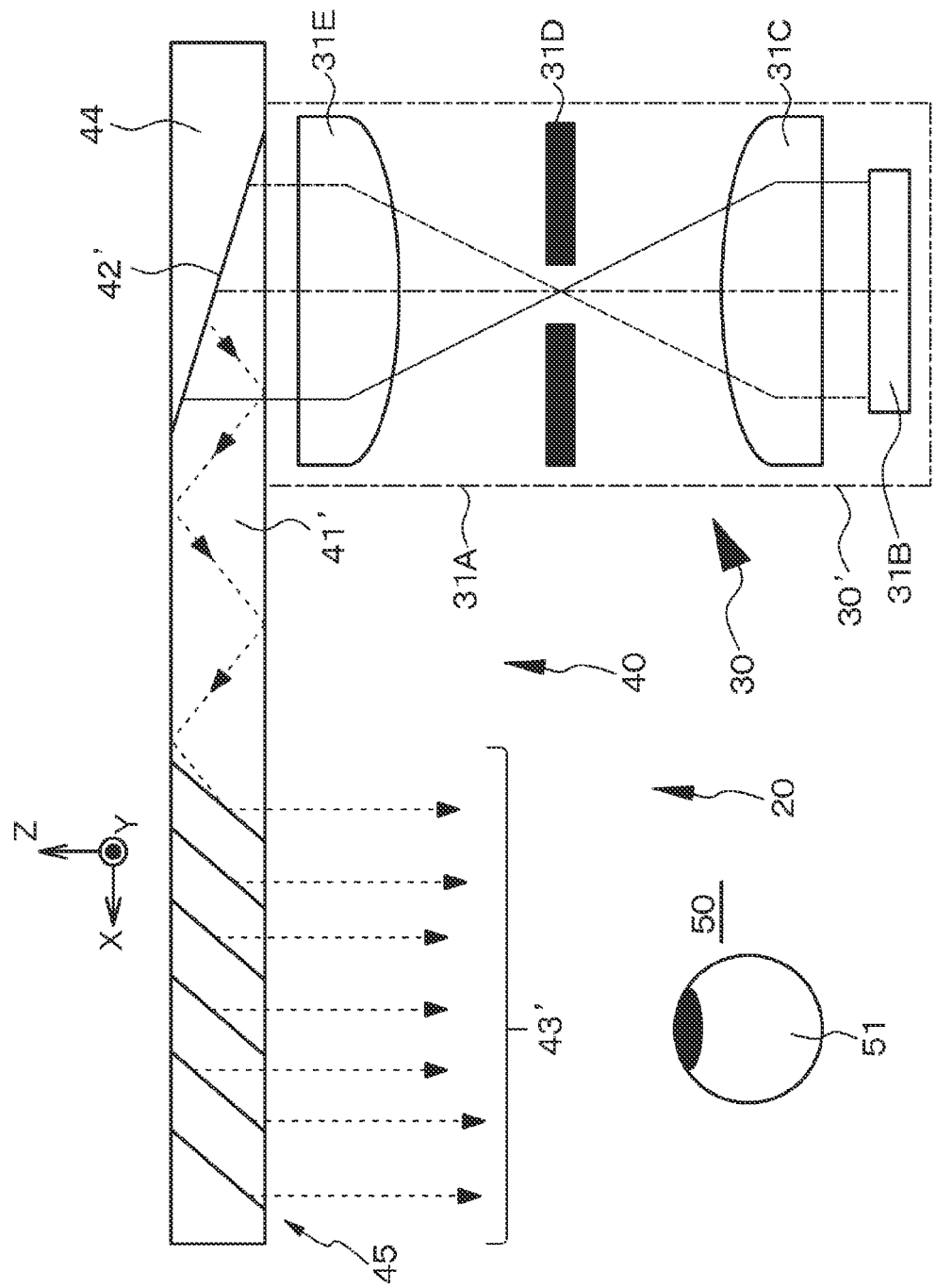
FIG. 11 is a view schematically illustrating arrangement of an image forming device and an optical device constituting a display device of Example 5.

As illustrated in a conceptual view of the image display device 20 in a display device (head mounted display) of Example 5 in FIG. 11, a first deflecting unit 42' and a second deflecting unit 43' are disposed inside a light guide plate 41' in Example 5. In addition, the first deflecting unit 42' reflects light incident on the light guide plate 41', and the second deflecting unit 43' transmits and reflects light propagated by total reflection inside the light guide plate 41' a plurality of times. That is, the first deflecting unit 42' functions as a reflecting mirror, and the second deflecting unit 43' functions as a semi-transmissive mirror. More specifically, the first deflecting unit 42' disposed inside the light guide plate 41' is constituted by a light reflecting film (a kind of mirror) that is constituted by aluminum (Al) and reflects light incident on the light guide plate 41'. Meanwhile, the second deflecting unit 43' disposed inside the light guide plate 41' is constituted by a multilayer laminated structure in which many dielectric laminated films are laminated. The dielectric laminated film includes, for example, a $TiO_2$ film as a high dielectric constant material and a $SiO_2$ film as a low dielectric constant material. Japanese Translation of PCT International Application No. 2005-521099 discloses a multilayer laminated structure in which many dielectric laminated films are laminated. Six layers of dielectric laminated films are illustrated in the drawings, but the present disclosure is not limited thereto. A thin piece containing the same material as a material constituting the light guide plate 41' is sandwiched between dielectric laminated films. In the first deflecting unit 42', parallel light incident on the light guide plate 41' is reflected so as to be totally reflected inside the light guide plate 41'. Meanwhile, in the second deflecting unit 43', parallel light propagated by total reflection inside the light guide plate 41' is reflected a plurality of times, and emitted from the light guide plate 41' toward the pupil 51 of the observer 50 in the state of parallel light.

As for the first deflecting unit 42', it is only required to perform the following. That is, by cutting out a portion 44 in which the first deflecting unit 42' is to be disposed in the light guide plate 41', a slope to form the first deflecting unit 42' is formed in the light guide plate 41', a light reflecting film is formed on the slope by vacuum vapor deposition, and then the cut-out portion 44 of the light guide plate 41' is bonded to the first deflecting unit 42'. Furthermore, as for the second deflecting unit 43', it is only required to perform the following. That is, a multilayer laminated structure obtained by laminating many layers of the same material (for example, glass) as a material constituting the light guide plate 41' and dielectric laminated films (for example, the dielectric laminated films can be formed by a vacuum vapor deposition method) is manufactured, a portion 45 in which the second deflecting unit 43' is to be disposed in the light guide plate 41' is cut out to form a slope, the multilayer laminated structure is bonded to the slope, and polishing or the like is performed to adjust an outer shape. In this way, the optical device 40 in which the first deflecting unit 42' and the second deflecting unit 43' are disposed inside the light guide plate 41' can be obtained.

Alternatively, FIG. 12 illustrates a conceptual view of the image display device 20 in a modification of the display device (head mounted display) of Example 5. In the example illustrated in FIG. 12, the image forming device 30 is constituted by the image forming device with second configuration in a similar manner to Example 4.

Example 6

Example 6 is a modification of Examples 1 to 5, and the optical device 40 further includes a dimmer that adjusts the amount of external light incident from the outside.

Although the dimmer will be described in detail below, the dimmer may include:

a first substrate;

a second substrate facing the first substrate;

a first transparent electrode disposed on a facing surface of the first substrate facing the second substrate;

a second transparent electrode disposed on a facing surface of the second substrate facing the first substrate; and a dimming layer sandwiched between the first transparent electrode and the second transparent electrode. In addition, in this case, for example, the first transparent electrode may include a plurality of band-shaped first transparent electrode segments extending in a first direction, the second transparent electrode may include a plurality of band-shaped second transparent electrode segments extending in a second direction different from the first direction, and a light shielding ratio of a portion of the dimmer corresponding to an overlap region between the first transparent electrode segments and the second transparent electrode segments (minimum unit region in which the light shielding ratio of the dimmer changes) may be controlled on the basis of control of voltages applied to the first transparent electrode segments and the second transparent electrode segments. That is, the light shielding ratio can be controlled on the basis of a simple matrix method. The first direction and the second direction may be orthogonal to each other, for example. During operation of the dimmer, during operation of the dimmer, for example, a voltage higher than that applied to the second transparent electrode is applied to the first transparent electrode.

Alternatively, in order to control the light shielding ratios of the minimum unit regions in which the light shielding ratio of the dimmer changes, a thin film transistor (TFT) may be disposed in each of the minimum unit regions. That is, the light shielding ratio may be controlled on the basis of an active matrix method. Alternatively, at least one of the first transparent electrode or the second transparent electrode may be a so-called solid electrode (electrode not patterned).

Either one of the first substrate and the second substrate may also serve as the light guide plate. With such a configuration, it is possible to reduce the weight of the entire display device, and there is no fear to cause a user of the display device to feel uncomfortable. Either one of the first substrate and the second substrate may be thinner than the other substrate. In the display device including the dimmer, it is only required to determine the size and the position of a region of the dimmer for actually controlling light on the basis of a signal for displaying an image in the image forming device. The size of the dimmer may be the same as, larger than, or smaller than that of the optical device. In short, the second deflecting unit (virtual image forming region) only needs to be located in an orthogonally projected image of the dimmer.

The dimming layer may be constituted by an optical shutter to which a color change of a substance generated by a redox reaction of an inorganic or organic electrochromic material is applied. Specifically, the dimming layer may contain an inorganic or organic electrochromic material. Moreover, from the first transparent electrode side, the dimming layer may have a laminated structure of inorganic electrochromic material layers such as $WO_3$ layer/$Ta_2O_5$ layer/$Ir_xSn_{1-x}O$ layer, or a laminated structure of inorganic electrochromic material layers such as $WO_3$ layer/$Ta_2O_5$ layer/$IrO_x$ layer. Instead of the $WO_3$ layer, a $MoO_3$ layer or a $V_2O_5$ layer can be used. Furthermore, instead of the $IrO_x$ layer, a $ZrO_2$ layer or a zirconium phosphate layer can be used, or a Prussian blue complex/nickel substituted Prussian blue complex or the like can also be used. As the organic electrochromic material, for example, electrochromic materials disclosed in Japanese Patent Laid-Open Nos. 2014-111710 and 2014-159385 can also be used. Furthermore, the dimming layer may include an electrophoretic dispersion liquid, and the dimmer may be constituted by an optical shutter using an electrodeposition method (electrodeposition/electric field deposition) to which an electrodeposition/dissociation phenomenon generated by a reversible redox reaction of a metal (for example, silver particles) is applied. That is, the dimming layer may include an electrolyte containing a metal ion. In a case where the dimming layer is constituted by an electrolyte layer containing a metal ion, the metal ion is desirably constituted by a silver ion, and the electrolyte desirably contains at least one salt selected from the group including LiX, NaX, and KX (in which X represents a fluorine atom, a chlorine atom, a bromine atom, or an iodine atom). Alternatively, as the dimmer, a liquid crystal shutter or an optical shutter that controls transmittance thereof by an electrowetting phenomenon can be used in some cases. Furthermore, a color in which light is colored by the dimmer may be a fixed color such as black. Light passing through the dimmer may be colored in a desired color by the dimmer. Moreover, the color in which light is colored by the dimmer may be variable. Specifically, for example, it is only required to laminate a dimmer that colors light in red, a dimmer that colors light in green, and a dimmer that colors light in blue.

Alternatively, the dimming layer may include an electrophoretic dispersion liquid, and the dimmer may be constituted by an optical shutter using an electrodeposition method (electrodeposition/electric field deposition) to which an electrodeposition/dissociation phenomenon generated by a reversible redox reaction of a metal (for example, silver particles) is applied. That is, the dimming layer may include an electrolyte containing a metal ion.

Here, the electrophoretic dispersion liquid includes a large number of charged electrophoretic particles and a dispersion medium having a different color from the electrophoretic particles. For example, in a case where the first transparent electrode is patterned and the second transparent electrode is not patterned (so-called solid electrode configuration), and the electrophoretic particles are negatively charged, by applying a relatively negative voltage to the first transparent electrode and applying a relatively positive voltage to the second transparent electrode, the negatively charged electrophoretic particles migrate so as to cover the second transparent electrode. Therefore, the light shielding ratio in the dimmer has a high value. Meanwhile, on the contrary, by applying a relatively positive voltage to the first transparent electrode and applying a relatively negative voltage to the second transparent electrode, the electrophoretic particles migrate so as to cover the first transparent electrode. Therefore, the light shielding ratio in the dimmer has a low value. Such an appropriate application of voltage to the transparent electrode makes it possible to control the light shielding ratio in the dimmer. The voltage may be direct current or alternating current. The shape of the patterned first transparent electrode only needs to be such a shape that a value of the light shielding ratio in the dimmer can be optimized when the electrophoretic particles migrate so as to cover the first transparent electrode and the light shielding ratio in the dimmer becomes a low value, and only needs to be determined by execution of various tests. If necessary, an insulating layer may be formed on the transparent electrode. Examples of a material constituting such an insulating layer include a colorless and transparent insulating resin, and specific examples thereof include an acrylic resin, an epoxy-based resin, a fluorocarbon-based resin, a silicone-based resin, a polyimide-based resin, a polystyrene-based resin, and the like.

Specific examples of a material constituting the transparent first and second substrates constituting the dimmer include a transparent glass substrate such as a soda lime glass or a white plate glass, a plastic substrate, a plastic sheet, and a plastic film. Here, examples of the plastic include polyethylene terephthalate, polyethylene naphthalate, polycarbonate, a cellulose ester such as cellulose acetate, a fluorocarbon-based polymer such as polyvinylidene fluoride or a copolymer of polytetrafluoroethylene and hexafluoropropylene, a polyether such as polyoxymethylene, polyacetal, polystyrene, a polyolefin such as polyethylene, polypropylene, or a methylpentene polymer, a polyimide such as polyamideimide or polyetherimide, polyamide, polyether sulfone, polyphenylene sulfide, polyvinylidene fluoride, tetraacetyl cellulose, brominated phenoxy, polyarylate, polysulfone, and the like. The plastic sheet and the plastic film may have rigidity that does not easily bend or may have flexibility. In a case where each of the first substrate and the second substrate includes a transparent plastic substrate, a barrier layer including an inorganic material or an organic material may be formed on an inner surface of the substrate.

The first substrate and the second substrate are sealed with a sealing member to be bonded to each other at an outer edge portion. Examples of the sealing member also referred to as a seal agent include various resins including a thermosetting resin, a photocurable resin, a moisture-curable resin, and an anaerobic curing resin, such as an epoxy-based resin, a urethane-based resin, an acrylic resin, a vinyl acetate-based resin, an ene-thiol-based resin, a silicone-based resin, or a modified polymer resin.

As described above, the first transparent electrode may be patterned or does not have to be patterned. The second transparent electrode may be patterned or does not have to be patterned. Specific examples of a material constituting the first transparent electrode and the second transparent electrode include an indium-tin composite oxide (ITO, including Sn-doped $In_2O_3$, crystalline ITO, and amorphous ITO), fluorine-doped $SnO_2$ (FTC)), F-doped $In_2O_3$ (IFO), antimony-doped $SnO_2$ (ATO), $SnO_2$, ZnO (including Al-doped ZnO and B-doped ZnO), indium-zinc composite oxide (IZO), a spinel type oxide, an oxide having a $YbFe_2O_4$ structure, a conductive polymer such as polyaniline, polypyrrole, or polythiophene, and the like, but are not limited thereto. Furthermore, two or more types thereof can be used in combination. The first transparent electrode and the second transparent electrode can be formed on the basis of a physical vapor deposition method (PVD method) such as a vacuum vapor deposition method or a sputtering method, various chemical vapor deposition methods (CVD methods), various coating methods, and the like. The patterning can be performed by any method such as an etching method, a lift-off method, or a method using various masks.

In some cases, the dimmer may be detachably disposed. In order to detachably dispose the dimmer, for example, the dimmer may be attached, for example, to a frame using a screw manufactured from a transparent plastic. Alternatively, the dimmer may be attached to a frame by forming a groove in the frame and engaging the dimmer with the groove or by attaching a magnet to the frame. Alternatively, the dimmer may be fitted in a slide portion by forming the slide portion in a frame. Alternatively, at least one of the first substrate or the second substrate may be attached to the frame, for example. Alternatively, the dimmer may be attached to the optical device. That is, the dimmer may be attached to the optical device while being in a close contact thereto, or may be attached to the optical device with a gap therebetween. In addition, in this case, the light guide plate and one of the substrates constituting the dimmer may be sealed with a sealing member to be bonded to each other at an outer edge portion. Examples of the sealing member also referred to as a seal agent include various resins including a thermosetting resin, a photocurable resin, a moisture-curable resin, and an anaerobic curing resin, such as an epoxy resin, a urethane-based resin, an acrylic resin, a vinyl acetate-based resin, an ene-thiol-based resin, a silicone-based resin, or a modified polymer resin. However, the present disclosure is not limited thereto. From an observer side, the optical device and the dimmer may be disposed in this order, or the dimmer and the optical device may be disposed in this order. Furthermore, it is only required to attach a connector to the dimmer (specifically, attach a connector to the first transparent electrode or the second transparent electrode), and to electrically connect the dimmer to a control circuit (which is the dimmer/control circuit, and is included, for example, in the control device 16 for controlling the image forming device) for controlling the light shielding ratio (light transmittance) of the dimmer via the connector or wiring. The dimmer may be curved.

The display device or the like of the present disclosure including the dimmer may further include an illuminance sensor (environmental illuminance measuring sensor) that measures illuminance of an environment in which the display device is placed, and may control the light shielding ratio of the dimmer on the basis of a measurement result of the illuminance sensor (environmental illuminance measuring sensor). Alternatively, the display device or the like of the present disclosure may further include the illuminance sensor (environmental illuminance measuring sensor) that measures the illuminance of an environment in which the display device is placed, and may control the brightness of an image formed by the image forming device on the basis of a measurement result of the illuminance sensor (environmental illuminance measuring sensor). These forms may be combined with each other.

Alternatively, the display device or the like of the present disclosure including the dimmer may further include a second illuminance sensor (also referred to as "transmitted light illuminance measuring sensor") that measures illuminance based on light which has passed through the dimmer from an external environment, and may control the light shielding ratio of the dimmer on the basis of a measurement result of the second illuminance sensor (transmitted light illuminance measuring sensor). Alternatively, the display device or the like of the present disclosure may further include the second illuminance sensor (transmitted light illuminance measuring sensor) that measures illuminance based on light which has passed through the dimmer from an external environment, and may control the brightness of an image formed by the image forming device on the basis of a measurement result of the second illuminance sensor (transmitted light illuminance measuring sensor). The second illuminance sensor (transmitted light illuminance measuring sensor) is desirably disposed closer to an observer than the optical device. At least two second illuminance sensors (transmitted light illuminance measuring sensors) may be disposed, and illuminance based on light which has passed through a portion with a high light shielding ratio and illuminance based on light which has passed through a portion with a low light shielding ratio may be measured. These forms may be combined with each other. Moreover, these forms may be combined with the above-described form in which control is performed on the basis of a measurement result of the illuminance sensor (environmental illuminance measuring sensor).

The illuminance sensor (environmental illuminance measuring sensor or transmitted light illuminance measuring sensor) only needs to be constituted by a well-known illuminance sensor, and only needs to be controlled on the basis of a well-known control circuit.

The maximum light transmittance of the dimmer may be 50% or more, and the minimum light transmittance of the dimmer may be 30% or less. An upper limit value of the maximum light transmittance of the dimmer may be 99%, and a lower limit value of the minimum light transmittance of the dimmer may be 1%. Here, there is a relationship of (light transmittance)=100 (%)−(light shielding ratio).

In some cases, as described above, light passing through the dimmer may be colored in a desired color by the dimmer. In addition, in this case, a color in which light is colored by the dimmer may be variable or fixed. In the former case, for example, it is only required to laminate a dimmer that colors light in red, a dimmer that colors light in green, and a dimmer that colors light in blue. Furthermore, in the latter case, a color in which light is colored by the dimmer is not limited, but may be brown, for example.

The light shielding ratio can be controlled and adjusted manually by observation of the lightness of light which has passed through the dimmer and the optical device by an observer and operation of a switch, a button, a dial, a slider, a knob, or the like by the observer. Alternatively, the light shielding ratio can be controlled and adjusted on the basis of a measurement result of the above-described second illuminance sensor (transmitted light illuminance measuring sensor) that measures illuminance based on light which has passed through the dimmer from an external environment. Note that specifically, control and adjustment of the light shielding ratio only need to be performed by controlling voltages applied to the first transparent electrode and the second transparent electrode. At least two second illuminance sensors (transmitted light illuminance measuring sensors) may be disposed, and illuminance based on light which has passed through a portion with a high light shielding ratio and illuminance based on light which has passed through a portion with a low light shielding ratio may be measured. The display device may include one image display device or two image display devices. In a case where the display device includes two image display devices, by adjusting voltages applied to the first transparent electrode and the second transparent electrode in each of one dimmer and the other dimmer, the light shielding ratios of one dimmer and the other dimmer can be equalized. The light shielding ratios in one dimmer and the other dimmer can be controlled, for example, on the basis of a measurement result of the above-described second illuminance sensor (transmitted light illuminance measuring sensor) that measures illuminance based on light which has passed through the dimmer from an external environment, or can be controlled and adjusted manually by observation of the lightness of light which has passed through one dimmer and the optical device and the lightness of light which has passed through the other dimmer and the optical device by an observer and operation of a switch, a button, a dial, a slider, a knob, or the like by the observer. In a case of adjusting the light shielding ratio, a test pattern may be displayed on the optical device.

Figure 13A:
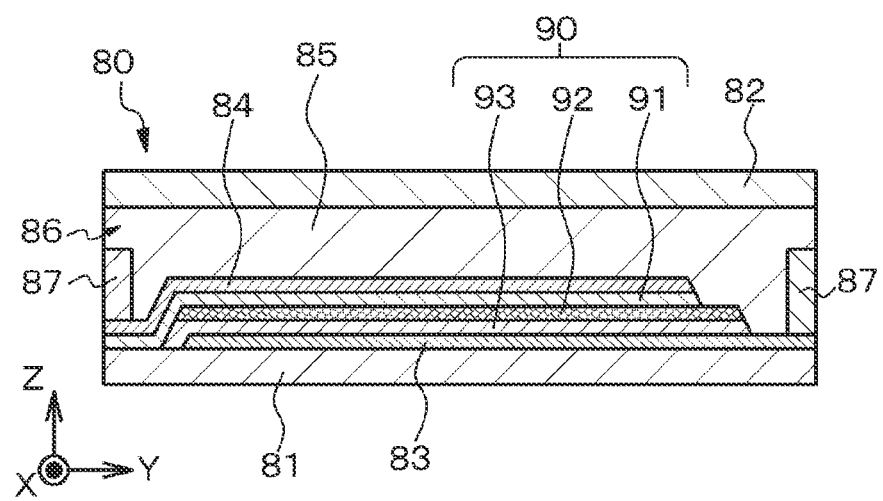
FIG. 13A is a schematic cross-sectional view of a dimmer.

As illustrated in a schematic cross-sectional view in FIG. 13A, a dimmer 80 includes:
a first substrate 81;
a second substrate 82 that is disposed facing the first substrate 81 and receives external light; and
a light emitting laminate disposed between the first substrate 81 and the second substrate 82, in which
the light emitting laminate is formed by laminating a first transparent electrode 83, a dimming layer 90, and a second transparent electrode 84 from the first substrate side, and
the dimming layer 90 has a laminated structure of a reduction coloring layer 91, an electrolyte layer 92, and an oxidation coloring layer 93.

In Example 6, the dimmer 80 is constituted by an optical shutter to which a color change of a substance generated by a redox reaction of an electrochromic material is applied. Specifically, the dimming layer 90 includes an electrochromic material. That is, the dimming layer 90 constituting the dimmer 80 includes an electrochromic material layer. Specifically, the dimming layer (electrochromic material layer) 90 has a laminated structure of the reduction coloring layer 91, the electrolyte layer 92, and the oxidation coloring layer 93. More specifically, the first transparent electrode 83 and the second transparent electrode 84 each contain a transparent conductive material such as ITO or IZO. The reduction coloring layer 91 contains tungsten oxide ($WO_3$). The electrolyte layer 92 contains tantalum oxide ($Ta_2O_5$). The oxidation coloring layer 93 contains an iridium atom. As a material forming the oxidation coloring layer 93 containing an iridium atom, an iridium oxide ($IrO_x$)-based material, specifically, iridium tin oxide ($Ir_ySn_{1-y}O_x$) was used in Example 6. Here, y=0.5. The $WO_3$ layer reductively develops a color. The $Ir_ySn_{1-y}O_x$ layer oxidatively develops a color. The $Ta_2O_5$ layer constitutes a solid electrolyte.

In the $Ir_ySn_{1-y}O$ layer, Ir and $H_2O$ react with each other, and exist as iridium hydroxide $Ir(OH)_n$. If a negative potential is applied to the first transparent electrode 83 and a positive potential is applied to the second transparent electrode 84, a proton $H^+$ moves from the $Ir_ySn_{1-y}O$ layer to the $Ta_2O_5$ layer, an electron is released to the second transparent electrode 84, the following oxidation reaction proceeds, and the $Ir_ySn_{1-y}O$ layer is colored.

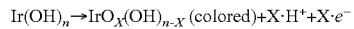

Meanwhile, a proton $H^+$ in the $Ta_2O_5$ layer moves into the $WO_3$ layer, and an electron is injected from the first transparent electrode 83 into the $WO_3$ layer. In the $WO_3$ layer, the following reduction reaction proceeds, and the $WO_3$ layer is colored.

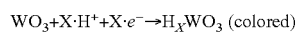

On the contrary, if a positive potential is applied to the first transparent electrode 83 and a negative potential is applied to the second transparent electrode 84, in the $Ir_ySn_{1-y}O$ layer, a reduction reaction proceeds in the opposite direction to the above, and decolorization occurs. In the $WO_3$ layer, an oxidation reaction proceeds in the opposite direction to the above, and decolorization occurs. The $Ta_2O_5$ layer contains $H_2O$. $H_2O$ is ionized by applying a voltage to the first transparent electrode 83 and the second transparent electrode 84. Inclusion of a proton $H^+$ and an $OH^-$ ion contributes to a coloring reaction and a decoloring reaction.

The first substrate 81 and the second substrate 82 each include a plastic material. Specifically, the first substrate 81 and the second substrate 82 each include, for example, a polycarbonate resin having a thickness of 0.3 mm. On an outer surface of the second substrate 82, a hard coat layer (not illustrated) containing acryl-modified colloidal silica particles, phenyl ketone-based and acrylate-based organic substances, and methyl ethyl ketone is formed.

In Example 6, the optical device 40 overlaps with at least a part of the dimmer 80 which is a kind of optical shutter. Specifically, the optical device 40 overlaps with the dimmer 80. That is, the light guide plate 41, 41' has the same (or substantially the same) outer shape as the first substrate 81 and the second substrate 82. The dimmer 80 overlaps with a large part of the light guide plate 41, 41'. However, the present disclosure is not limited thereto. The optical device 40 may overlap with a part of the dimmer 80, or the dimmer 80 may overlap with a part of the optical device 40. Furthermore, from an observer side, the optical device 40 and the dimmer 80 are disposed in this order, but the dimmer 80 and the optical device 40 may be disposed in this order.

Furthermore, a moisture holding member 85 is disposed at least between the second transparent electrode 84 and the second substrate 82. In addition, an end face of the moisture holding member 85 is exposed to the outside. At least a part of an end portion (side surface) of the dimmer 80 is constituted by a sealing member 87 and the moisture holding member 85 from the first substrate side. That is, at least a part of the end portion of the dimmer 80 has a laminated structure of the sealing member 87 and a moisture holding member extending portion 86 extending from the moisture holding member 85 from the first substrate side. The sealing member 87 is disposed, for example, at an edge portion of the first substrate 81.

In addition, the second transparent electrode 84 is formed from a top surface of the dimming layer 90 to a top surface of the first substrate 81 so as to be apart from the first transparent electrode 83, and the moisture holding member 85 covers at least the second transparent electrode. 84 and the dimming layer 90. That is, the first transparent electrode 83 is formed on the first substrate 81. The dimming layer 90 is formed on the first transparent electrode 83. The second transparent electrode 84 is formed at least on the dimming layer 90. The moisture holding member 85 covers at least the second transparent electrode 84 and faces the second substrate 82. The moisture holding member extending portion 86 extending from the moisture holding member 85 is disposed between the sealing member 87 and the second substrate. Moreover, a part of the sealing member 87 is constituted by an auxiliary electrode (not illustrated) containing copper (Cu). Furthermore, the rest of the sealing member 87 is constituted by a resin, specifically, an acrylic adhesive. The auxiliary electrode includes a first auxiliary electrode formed on the first transparent electrode 83 and a second auxiliary electrode formed on the second transparent electrode 84 so as to be apart from the first auxiliary electrode. The sealing member 87 and the moisture holding member extending portion 86 constitute a side wall of the dimmer 80. Furthermore, the sealing member 87 is disposed without any gap.

A resin constituting the moisture holding member 85, which can also be called a proton supply member, a transparent adhesive member that can hold moisture, or a transparent sealing member that can hold moisture, and the moisture holding member extending portion 86 only needs to be appropriately selected from an acrylic resin, a silicone-based resin, and a urethane-based resin. In Example 6, specifically, the resin is constituted by an acrylic resin.

By constituting the moisture holding member 85 and the moisture holding member extending portion 86 from a material having a Young's modulus of $1 \times 10^6$ Pa or less, various steps generated inside the dimmer can be absorbed, and variation in the thickness of the moisture holding member 85 and variation in the thickness of the moisture holding member extending portion 86 in the central portion of the dimmer can be reduced. That is, the entire distance between the first substrate and the second substrate can be made uniform. In addition, as a result, it is possible to prevent occurrence of deterioration in visibility. Specifically, when an external world is viewed through the dimmer 80, it is possible to suppress occurrence of distortion in an image in the external world or occurrence of displacement in the image in the external world.

The first transparent electrode 83 and the second transparent electrode 84 constituted by ITO are not patterned but are so-called solid electrodes. A connector (not illustrated) is attached to a part of an auxiliary electrode of the dimmer 80. The first transparent electrode 83 and the second transparent electrode 84 are electrically connected to a control circuit (specifically, control device 16) for controlling the light shielding ratio of the dimmer 80.

When moisture disappears inside an electrochromic element, a color change does not occur in the electrochromic element. However, in the dimmer of Example 6, since moisture comes in and out through an end face of the moisture holding member extending portion (side wall of the dimmer), it is possible to avoid generation of a disadvantage such as a decrease in reliability of the dimmer, the image display device, or the display device. Moreover, since the auxiliary electrode is disposed, it is possible to easily apply an appropriate voltage to the first transparent electrode and the second transparent electrode, and to suppress voltage drop in the first transparent electrode or the second transparent electrode. As a result, it is possible to reduce unevenness generated when the dimmer performs coloring.

The dimmer 80 may be in an operation state all the time, may be determined to be in an operation/non-operation (ON/OFF) state by instruction (operation) of an observer, or may be normally in a non-operation state while starting operation on the basis of a signal for displaying an image in the image display device 20. In order to determine an operation/non-operation state by instruction (operation) of an observer, for example, the display device only needs to further include a microphone via which a voice is input and the dimmer 80 is thereby controlled. Specifically, switching of operation/non-operation of the dimmer 80 only needs to be controlled according to an instruction based on a real voice of an observer. Alternatively, information to be obtained may be input by voice input. Alternatively, the display device only needs to further include an infrared input/output device to control operation of the dimmer 80. Specifically, switching of operation/non-operation of the dimmer 80 only needs to be controlled by detection of a blink of an observer by the infrared input/output device.

The display device of Example 6 includes the dimmer, and therefore can impart a high contrast to a virtual image observed by an observer. Moreover, the observer using the display device can surely recognize an external environment through the optical device.

In some cases, by dividing the first transparent electrode and/or the second transparent electrode into a plurality of blocks and controlling a light shielding ratio in each of the blocks, the light shielding ratio for each region of the dimmer may be controlled. Alternatively, by forming the first transparent electrode or the second transparent electrode into a band-shaped electrode or a mesh-shaped electrode, or forming a band-shaped auxiliary electrode or a mesh-shaped auxiliary electrode on the first transparent electrode or the second transparent electrode, it is possible to independently control light shielding ratios in a plurality of regions of the dimmer. In some cases, the dimmer may be constituted by a liquid crystal display device driven on the basis of, for example, an active matrix system or a simple matrix system, and the light shielding ratio of the dimmer may be controlled.

Figure 13B:
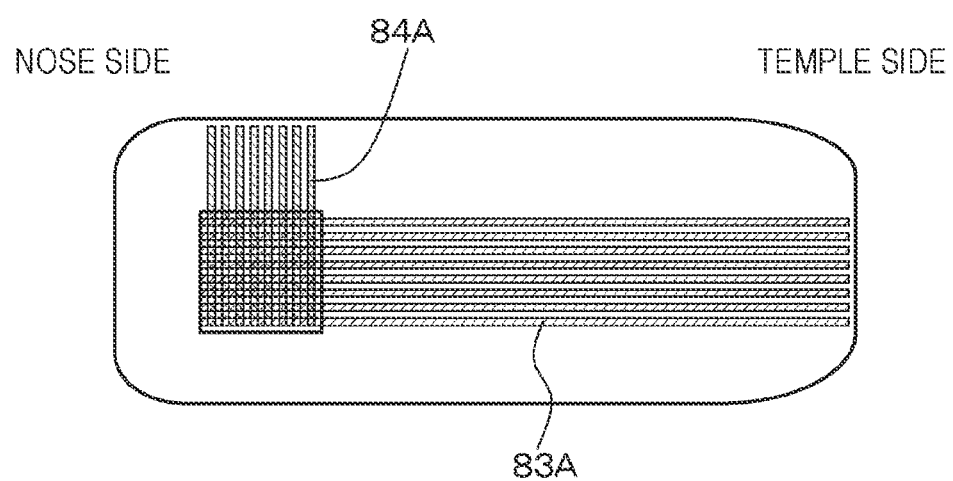
FIG. 13B is a schematic front view of a modification of the dimmer.

The light shielding ratio in the dimmer 80 can be controlled, for example, on the basis of a simple matrix method. That is, as illustrated in a schematic plant view of a modification of the dimmer 80 in FIG. 13B, the first transparent electrode 83 includes a plurality of band-shaped first transparent electrode segments 83A extending in a first direction.

The second transparent electrode 84 includes a plurality of band-shaped second transparent electrode segments 84A extending in a second direction different from the first direction.

A light shielding ratio of a portion of the dimmer corresponding to an overlap region between the first transparent electrode segments 83A and the second transparent electrode segments 84A (minimum unit region in which the light shielding ratio of the dimmer changes) is controlled on the basis of control of voltages applied to the first transparent electrode segments 83A and the second transparent electrode segments 84A. The first direction is perpendicular to the second direction. Specifically, the first direction extends in a transverse direction (X direction), and the second direction extends in a longitudinal direction (Y direction). In such a configuration, the auxiliary electrode is unnecessary.

Figure 14A:
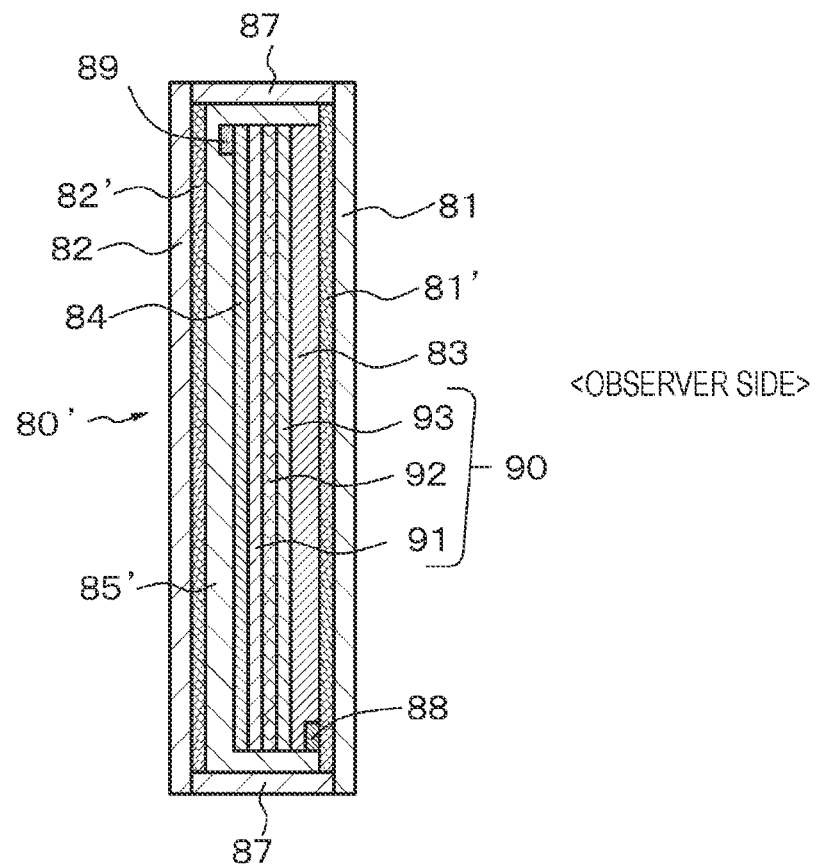
FIG. 14A is a schematic cross-sectional view of another modification of the dimmer.
Figure 14B:
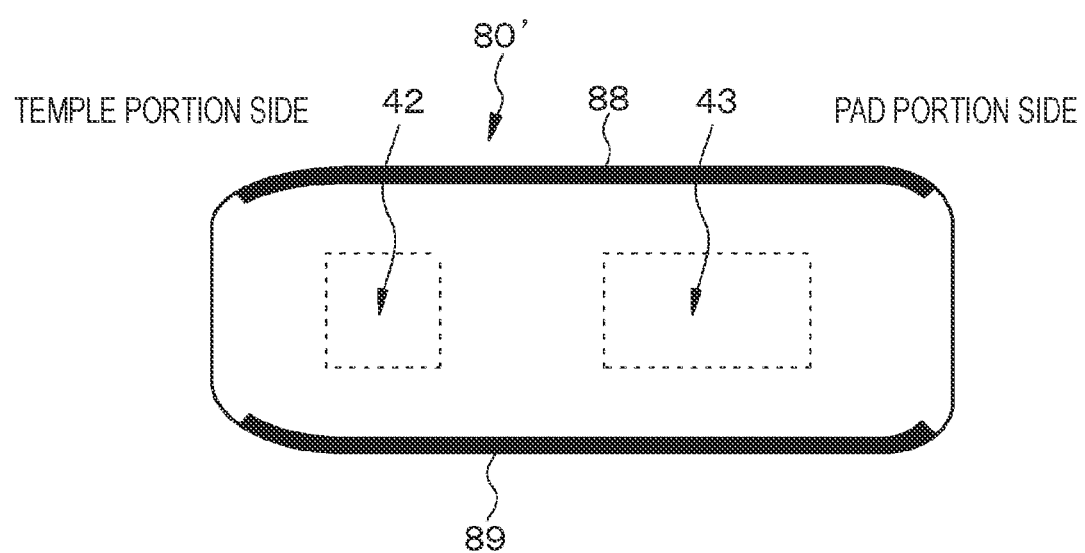
FIG. 14B is a schematic front view of the another modification of the dimmer.

Alternatively, a schematic cross-sectional view of another modification of the dimmer 80' is illustrated in FIG. 14A, and a schematic front view thereof is illustrated in FIG. 14B. In this dimmer 80', the first substrate 81, the second substrate 82, the light emitting laminate (first transparent electrode 83, dimming layer 90, and second transparent electrode 84), the dimming layer 90 (reduction coloring layer 91, electrolyte layer 92, and oxidation coloring layer 93), and the sealing member 87 have similar configurations and structures to the dimmer 80 of Example 6 described above. In the schematic cross-sectional view of the dimmer 80' illustrated in FIG. 14A, the first auxiliary electrode and the second auxiliary electrode not illustrated in FIG. 13A are denoted by reference numerals 88 and 89, respectively. Furthermore, in the schematic cross-sectional view of the dimmer 80' illustrated in FIG. 14A, the barrier layers not illustrated in FIG. 13A (for example, containing an inorganic material, specifically alumina) are denoted by reference numerals 81' and 82'. Moreover, a protective layer 85' including an SiN layer, an $SiO_2$ layer, an $Al_2O_3$ layer, a $TiO_2$ layer, or a laminated film thereof is formed between the second transparent electrode 84 and the barrier layer 82'. By forming the protective layer 85', an ion blocking property preventing transfer of ions, water-proofness, moisture-proofness, and scratch resistance can be imparted to the dimmer.

The optical device 40 overlaps with the dimmer 80'. That is, the light guide plate 41, 41' has the same (or substantially the same) outer shape as the first substrate 81 and the second substrate 82. The first transparent electrode 83 and the second transparent electrode 84 constituted by ITO are not patterned but are so-called solid electrodes. A connector (not illustrated) is attached to a part of the auxiliary electrode 88, 89 of the dimmer 80'. The first transparent electrode 83 and the second transparent electrode 84 are electrically connected to a control circuit (specifically, control device 16) for controlling the light shielding ratio of the dimmer 80'.

Hitherto, the present disclosure has been described on the basis of the preferable Examples. However, the present disclosure is not limited to these Examples. The configurations and structures of the display device (head mounted display), the image display device, and the optical device described in Examples are illustrative and can be appropriately changed. In Examples, the substrate constituting the light guide plate contains a resin material. However, alternatively, a glass substrate obtained by simplifying a surface polishing step of the substrate as compared to precision quality, specifically, a glass substrate (optical glass substrate) having Rq of about 5 nm, which is a standard quality, can also be used. By simplifying the surface polishing step as described above, it is possible to inexpensively provide an optical device having a contrast and a resolution as high as those of a conventional optical device and a display device including such an optical device.

Furthermore, for example, a surface relief type hologram (see US 2004/0062505 A1) may be disposed on the light guide plate, or as a diffraction grating member, a surface relief type diffraction grating member disclosed in U.S. Pat. No. 9,513,480 B2 (US 2016/0231568 A1) can also be used. One of the first deflecting unit and the second deflecting unit may be constituted by a reflection type diffraction grating member and the other may be constituted by a transmission type diffraction grating member. Alternatively, the diffraction grating member may be a reflection type blazed diffraction grating member, and a hologram diffraction grating member may be constituted by a polymer dispersed liquid crystal (PDLC) mixture disclosed in Japanese Patent Application Laid-Open No. 2014-132328.

Furthermore, the display device of the present disclosure can also be used as a stereoscopic displaying device. In this case, if necessary, it is only required to detachably attach a polarizing plate or a polarizing film to the optical device, or to stick the polarizing plate or the polarizing film to the optical device.

In Examples, it has been described that the image forming device displays an image of a single color (for example, green), but the image forming device can display a color image. In this case, the light source only needs to include light sources that emit, for example, red, green, and blue, respectively. More specifically, for example, it is only required to obtain white light by mixing colors of red light, green light, and blue light emitted from a red light emitting element, a green light emitting element, and a blue light emitting element, respectively, using a light pipe and uniformizing brightness.

Modifications of the optical device described in Example 3 or 4 are illustrated in FIGS. 15 and 16, but an optical member 46 may be disposed in the optical device 40 facing the second deflecting unit 43. Light emitted from the image forming device 30 is deflected (or reflected) by the first deflecting unit 42, propagated by total reflection inside the light guide plate 41, deflected by the second deflecting unit 43, and incident on the optical member 46. The optical member 46 emits the incident light toward the pupil 51 of the observer 50. A large part of the light passing through the second deflecting unit 43 does not satisfy diffraction conditions in the second deflecting unit 43, and therefore is not diffracted or reflected by the second deflecting unit 43 and is incident on the pupil 51 of the observer 50. The optical member 46 is constituted, for example, by a hologram lens, and is disposed, for example, on a first surface side of the light guide plate 41. The second deflecting unit 43 is disposed on the first surface side of the light guide plate 41 (refer to FIG. 15) or on a second surface side (refer to FIG. 16).

The optical device described in Example 3 or 4 can be modified as described below. That is, as illustrated in a conceptual view of the optical device in FIG. 17, the optical device may include a first reflection type volume hologram diffraction grating member 47, a second reflection type volume hologram diffraction grating member 48, and a third reflection type volume hologram diffraction grating member 49. In the first reflection type volume hologram diffraction grating member 47, an interference fringe of the diffraction grating member extends substantially parallel to the Y-axis (y-axis). In the second reflection type volume hologram diffraction grating member 48, an interference fringe of the diffraction grating member extends substantially parallel to the X-axis (x-axis). In the third reflection type volume hologram diffraction grating member 49, an interference fringe of the diffraction grating member extends in an oblique direction (y' direction). A light beam emitted from the image forming device 30 is diffracted in the X-axis direction by the first reflection type volume hologram diffraction grating member 47, propagated through the light guide plate 41, and incident on the third reflection type volume hologram diffraction grating member 49. Then, the light beam is diffracted obliquely downward by the third reflection type volume hologram diffraction grating member 49, and incident on the second reflection type volume hologram diffraction grating member 48. Then, the light beam is diffracted in a Z-axis direction by the second reflection type volume hologram diffraction grating member 48, and incident on the pupil 51 of the observer 50. A line segment connecting an incident point and an emission point includes two line segments $L_{0-A}$ and $L_{0-B}$. A light guide region includes two regions of

Figure 17:
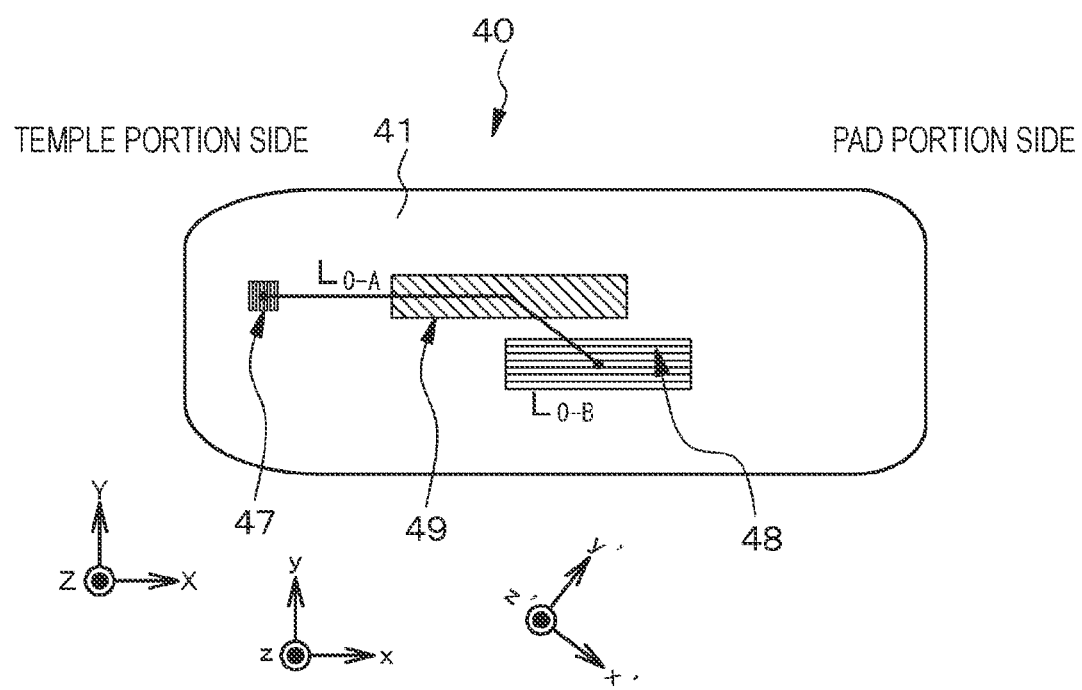
FIG. 17 is a conceptual view of an optical device in still another modification of the display device of Example 3 or 4.

[A] a region of the light guide plate 41 facing a region sandwiched by a right end of the first reflection type volume hologram diffraction grating member 47 in FIG. 17 and a left end of the third reflection type volume hologram diffraction grating member 49 in FIG. 17,
and
[B] a region of the light guide plate 41 facing a region sandwiched by a lower end of the third reflection type volume hologram diffraction grating member 49 in FIG. 17 and an upper end of the second reflection type volume hologram diffraction grating member 48 in FIG. 17. Furthermore, the entire light guide region includes the above two regions of the light guide plate 41, and
[C] a region of the light guide plate 41 facing the first reflection type volume hologram diffraction grating member 47,
[D] a region of the light guide plate 41 facing the third reflection type volume hologram diffraction grating member 49,
and
[E] a region of the light guide plate 41 facing the second reflection type volume hologram diffraction grating member 48.

Figure 18A:
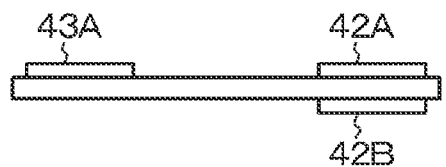
FIGS. 18A, 18B, 18C, 18D, 18E, and 18F are conceptual views of an optical device in still another modification of the display device of Example 3 or 4.
Figure 18B:
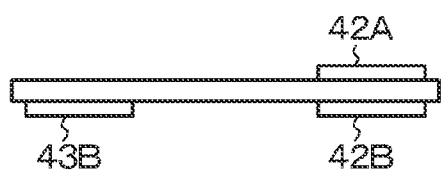
Figure 18C:
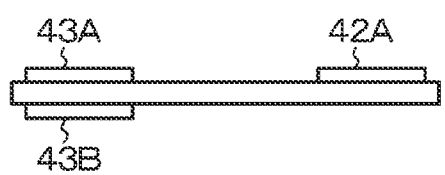
Figure 18D:
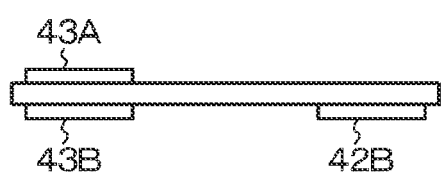
Figure 18E:
Figure 18F:
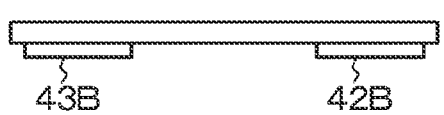

Alternatively, the optical device described in Example 3 or 4 can be modified as described below. That is, as illustrated in a conceptual view in FIG. 18A, a hologram diffraction grating member on a light incident side may be constituted by a reflection type diffraction grating member 42A and a transmission type diffraction grating member 42B, and a hologram diffraction grating member on a light emitting side may be constituted by a reflection type diffraction grating member 43A. Alternatively, as illustrated in a conceptual view in FIG. 18B, the hologram diffraction grating member on a light incident side may be constituted by the reflection type diffraction grating member 42A and the transmission type diffraction grating member 42B, and the hologram diffraction grating member on a light emitting side may be constituted by a transmission type diffraction grating member 43B. Alternatively, as illustrated in a conceptual view in FIG. 18C, the hologram diffraction grating member on a light incident side may be constituted by the reflection type diffraction grating member 42A, and the hologram diffraction grating member on a light emitting side may be constituted by the reflection type diffraction grating member 43A and the transmission type diffraction grating member 43B. Alternatively, as illustrated in a conceptual view in FIG. 18D, the hologram diffraction grating member on a light incident side may be constituted by the transmission type diffraction grating member 42B, and the hologram diffraction grating member on a light emitting side may be constituted by the reflection type diffraction grating member 43A and the transmission type diffraction grating member 43B. Alternatively, as illustrated in a conceptual view in FIG. 18E, the hologram diffraction grating member on a light incident side may be constituted by the reflection type diffraction grating member 42A and the transmission type diffraction grating member 42B, and the hologram diffraction grating member on a light emitting side may be constituted by the reflection type diffraction grating member 43A and the transmission type diffraction grating member 43B. Alternatively, as illustrated in a conceptual view in FIG. 18F, the hologram diffraction grating member on a light incident side may be constituted by the transmission type diffraction grating member 42B, and the hologram diffraction grating member on a light emitting side may be constituted by the transmission type diffraction grating member 43B.

Note that the present disclosure can have the following configurations.

[A01] <<Display Device: First Aspect>>
A display device including:
a frame that includes a front portion disposed in front of an observer, temple portions extending from both ends of the front portion, and a pad portion, and is to be mounted on the head of the observer; and
an image display device attached to the frame, in which the image display device includes:
an image forming device; and
an optical device on which light emitted from the image forming device is incident and from which the light is emitted toward the observer,
one end portion of the optical device is fixed to a temple portion side of the front portion,
the other end portion of the optical device is disposed on a pad portion side of the front portion, and
a light shielding member that prevents external light from being incident on the other end portion of the optical device from above the other end portion of the optical device is attached to the pad portion side of the front portion.

[A02] The display device according to [A01], in which the other end portion of the optical device freely slides on a facing surface of the light shielding member facing the observer.

[A03] The display device according to [A01] or [A02], in which one end portion of the optical device is attached to the image forming device disposed on the temple portion side of the front portion.

[A04] The display device according to any one of [A01] to [A03], in which the optical device includes:
a light guide plate in which light incident from the image forming device is propagated by total reflection inside the light guide plate, and then the light is emitted toward the observer;
a first deflecting unit that deflects the light incident on the light guide plate such that the light incident on the light guide plate is totally reflected inside the light guide plate; and
a second deflecting unit that deflects the light propagated by total reflection inside the light guide plate for emitting the light propagated by total reflection inside the light guide plate from the light guide plate.

[A05] The display device according to any one of [A01] to [A04], in which the image forming device is attached to a temple portion side of the front portion.

[A06] The display device according to any one of [A01] to [A05], in which the optical device further includes a dimmer that adjusts the amount of external light incident from the outside.

[B01] <<Display Device: Second Aspect>>
A display device including:
a frame that includes a front portion disposed in front of an observer, temple portions extending from both ends of the front portion, and a pad portion, and is to be mounted on the head of the observer; and
an image display device attached to the frame, in which the image display device includes:
an image forming device; and
an optical device that on which light emitted from the image forming device is incident and from which the light is emitted toward the observer,
one end portion of the optical device is fixed to a temple portion side of the front portion, and
the other end portion of the optical device is disposed on a pad portion side of the front portion, and freely slides on the front portion.

[B02] The display device according to [B01], in which
an optical device receiving member is attached to the pad portion side of the front portion, and
the other end portion of the optical device freely slides on the optical device receiving member.

[B03] The display device according to [B02], in which
the optical device receiving member is constituted by a member having an L-shaped cross section when being cut with a virtual horizontal plane,
a first portion of the optical device receiving member, corresponding to an L-shaped vertical bar, extends in a vertical direction facing the observer,
a second portion of the optical device receiving member, corresponding to an L-shaped horizontal bar extending from an end portion of the first portion of the optical device receiving member farther from the observer, extends to the temple portion side of the front portion, and
the other end portion of the optical device freely slides on a facing surface of the second portion of the optical device receiving member facing the observer.

[B04] The display device according to any one of [B01] to [B03], in which one end portion of the optical device is attached to the image forming device disposed on the temple portion side of the front portion.

[B05] The display device according to any one of [B01] to [B04], in which the optical device includes:
a light guide plate in which light incident from the image forming device is propagated by total reflection inside the light guide plate, and then the light is emitted toward the observer;
a first deflecting unit that deflects the light incident on the light guide plate such that the light incident on the light guide plate is totally reflected inside the light guide plate; and
a second deflecting unit that deflects the light propagated by total reflection inside the light guide plate for emitting the light propagated by total reflection inside the light guide plate from the light guide plate.

[B06] The display device according to any one of [B01] to [B05], in which the image forming device is attached to a temple portion side of the front portion.

[B07] The display device according to any one of [B01] to [B06], in which the optical device further includes a dimmer that adjusts the amount of external light incident from the outside.

REFERENCE SIGNS LIST 1A, 1B Display device
10 Frame
11 Front portion
12 Temple portion
13 Modern portion (leading cell, earmuff, or ear pad)
14 Wiring (signal line, power supply line, or the like)
15 Headphone portion
15' Headphone portion wiring
16 Control device (control circuit or control unit)
17 Pad portion (nose pad portion)
20 Image display device
30 Image forming device
30 Image forming device
30' Casing
31A Casing
31B Organic EL display device
31C First convex lens
31D Diaphragm
31E Second convex lens
32A Casing
32B Light source
32C Polarization beam splitter
32D Liquid crystal display device (LCD)
32E Optical system (parallel light emission optical system or collimate optical system)
33A Casing
33B Light source
33C Scanning unit
33D Lens system
40 Optical device
40A One end portion of optical device
40B The other end portion of optical device
41, 41' Light guide plate
41A First surface of light guide plate
41B Second surface of light guide plate
42, 42', 42A, 42B, 42C First deflecting unit (first diffraction grating member)
43, 43', 43A, 43B, 43C Second deflecting unit (second diffraction grating member)
44 Portion of light guide plate in which first deflecting unit is to be disposed
45 Portion of light guide plate in which second deflecting unit is to be disposed in
46 Optical member
50 Observer 51 Eyeball (pupil)
60 Light shielding member
60A Facing surface of light shielding member facing observer
70 Optical device receiving member
71 Facing surface of second portion of optical device receiving member facing observer
72 First portion of optical device receiving member
72' End portion of first portion of optical device receiving member
73 Second portion of optical device receiving member
80, 80' Dimmer
81 First substrate
82 Second substrate
81', 82' Barrier layer
83 First transparent electrode
84 Second transparent electrode
85 Moisture holding member
85' Protective layer
86 Moisture holding member extending portion
87 Sealing member
88 First auxiliary electrode
89 Second auxiliary electrode
90 Dimming layer
91 Reduction coloring layer
92 Electrolyte layer
93 Oxidation coloring layer

The invention claimed is:

1. A display device, comprising:
   a frame that includes:
      a front portion in front of an observer,
      temple portions extending from both ends of the front portion, and
      a pad portion,
         wherein the frame is mountable on a head of the observer; and
   an image display device attached to the frame, wherein the image display device includes:
      an image forming device,
      an optical device on which light emitted from the image forming device is incident, wherein
         the light is emitted toward the observer from the optical device,
         a first end portion of the optical device is fixed to a temple portion side of the front portion,
         a second end portion of the optical device is on a pad portion side of the front portion,
         the optical device includes a dimmer configured to adjust an amount of external light incident from an outside of the display device,
         the dimmer includes:
            a moisture holding member,
            a moisture holding member extending portion that extends from the moisture holding member, and
            a dimming layer,
         the dimming layer includes:
            a reduction coloring layer,
            an electrolyte layer, and
            an oxidation coloring layer, and
      a light shielding member configured to prevent the external light from being incident on the second end portion of the optical device from above the second end portion of the optical device,
         wherein the light shielding member is attached to the pad portion side of the front portion.

2. The display device according to claim 1, wherein the second end portion of the optical device is freely slidable on a facing surface of the light shielding member facing the observer.

3. The display device according to claim 1, wherein the first end portion of the optical device is attached to the image forming device on the temple portion side of the front portion.

4. The display device according to claim 1, wherein the optical device further includes:
   a light guide plate in which the light incident from the image forming device is propagated by total reflection inside the light guide plate, and then the light is emitted toward the observer;
   a first deflecting unit configured to deflect the light incident on the light guide plate such that the light incident on the light guide plate is totally reflected inside the light guide plate; and
   a second deflecting unit configured to deflect the light propagated by the total reflection inside the light guide plate to emit the light propagated by the total reflection inside the light guide plate from the light guide plate.

5. The display device according to claim 1, wherein the image forming device is attached to the temple portion side of the front portion.

6. The display device according to claim 1, wherein
   the dimmer further includes an electrode and a substrate, and
   the moisture holding member is between the electrode and the substrate.

7. The display device according to claim 1, wherein the moisture holding member and the moisture holding member extending portion include a material having a Young's modulus of $1 \times 10^6$ Pa or less.

8. A display device, comprising:
   a frame that includes:
      a front portion in front of an observer,
      temple portions extending from both ends of the front portion, and
      a pad portion,
         wherein the frame is mountable on a head of the observer; and
   an image display device attached to the frame, wherein the image display device includes:
      an image forming device,
      an optical device on which light emitted from the image forming device is incident, wherein
         the light is emitted toward the observer from the optical device,
         a first end portion of the optical device is fixed to a temple portion side of the front portion,
         a second end portion of the optical device is on a pad portion side of the front portion,
         the second end portion is freely slidable on the front portion,
         the optical device includes a dimmer configured to adjust an amount of external light incident from an outside of the display device, and
         the dimmer includes:
            a moisture holding member,
            a moisture holding member extending portion that extends from the moisture holding member, and
            a dimming layer,
         the dimming layer includes:
            a reduction coloring layer,
            an electrolyte layer, and
            an oxidation coloring layer.

9. The display device according to claim 8, further comprising an optical device receiving member attached to the pad portion side of the front portion, wherein the second end portion of the optical device is freely slidable on the optical device receiving member.

10. The display device according to claim 9, wherein the optical device receiving member has an L-shaped cross section, a first portion of the optical device receiving member extends in a vertical direction facing the observer, a second portion of the optical device receiving member extends from an end portion of the first portion of the optical device receiving member farther from the observer, the second portion of the optical device receiving member extends to the temple portion side of the front portion, and the second end portion of the optical device is freely slidable on a facing surface of the second portion of the optical device receiving member facing the observer.

11. The display device according to claim 8, wherein the first end portion of the optical device is attached to the image forming device on the temple portion side of the front portion.

12. The display device according to claim 8, wherein the optical device includes:

a light guide plate in which the light incident from the image forming device is propagated by total reflection inside the light guide plate, and then the light is emitted toward the observer;

a first deflecting unit configured to deflect the light incident on the light guide plate such that the light incident on the light guide plate is totally reflected inside the light guide plate; and a second deflecting unit configured to deflect the light propagated by the total reflection inside the light guide plate to emit the light propagated by the total reflection inside the light guide plate from the light guide plate.

13. The display device according to claim 12, wherein the optical device further includes an optical member on the second deflecting unit, the light deflected by the second deflection unit is incident on the optical member, and the optical member is configured to emit the light toward the observer.

14. The display device according to claim 8, wherein the image forming device is attached to the temple portion side of the front portion.

* * * * *